United States Patent [19]

Barnstead et al.

[11] Patent Number: 5,321,430
[45] Date of Patent: Jun. 14, 1994

[54] APPARATUS AND METHOD FOR GRAY AND EDGE ENHANCEMENT

[75] Inventors: George W. Barnstead, English Town; John T. O'Neil, Princeton, both of N.J.

[73] Assignee: Acer Incorporated, Taipei, Taiwan

[21] Appl. No.: 697,092

[22] Filed: May 8, 1991

[51] Int. Cl.[5] ............................................. H04N 1/21
[52] U.S. Cl. ................................................... 346/108
[58] Field of Search ................ 346/108, 160; 358/296, 358/300, 302; 395/375

[56] References Cited

U.S. PATENT DOCUMENTS

| 4,951,159 | 8/1990 | Van Beck | 358/455 |
| 4,963,989 | 10/1990 | Morton | 358/298 |
| 4,987,484 | 1/1991 | Ikeda et al. | 358/75 |
| 5,157,773 | 10/1992 | Matsumoto et al. | 395/375 |

FOREIGN PATENT DOCUMENTS

| 0213949A2 | 3/1987 | European Pat. Off. | H04N 1/40 |
| 0356038A2 | 2/1990 | European Pat. Off. | B41J 2/455 |
| 0388833A2 | 9/1990 | European Pat. Off. | G06K 15/12 |
| 3618032A1 | 1/1987 | Fed. Rep. of Germany | B41J 3/21 |

Primary Examiner—Mark J. Reinhart
Attorney, Agent, or Firm—Kenneth M. Kaslow

[57] ABSTRACT

An apparatus and method for improving the printing and edge enhancement of laser printers comprises a video clock counter, an input selector, a calibration selector, a mode selector, a decoding array, a register, memory and an address counter. The gray and edge enhancement circuit modifies the data received from the laser print controller to smooth edges in the image sent to the laser. The present invention compares each pixel and surrounding pixels in an area seven pixels wide and seven pixels long to correction bit patterns. If a match is found the pixels are modified to enhance any edges defined by the pixels. The gray and edge enhancement circuit also includes an operating mode in which shades of gray may be printed with a resolution of 150 dpi. The circuit uses the decoding array to pulse width modify the input data to various shades of gray.

15 Claims, 26 Drawing Sheets

MAPS FOR FIGURES 2, 3, 4 AND 8

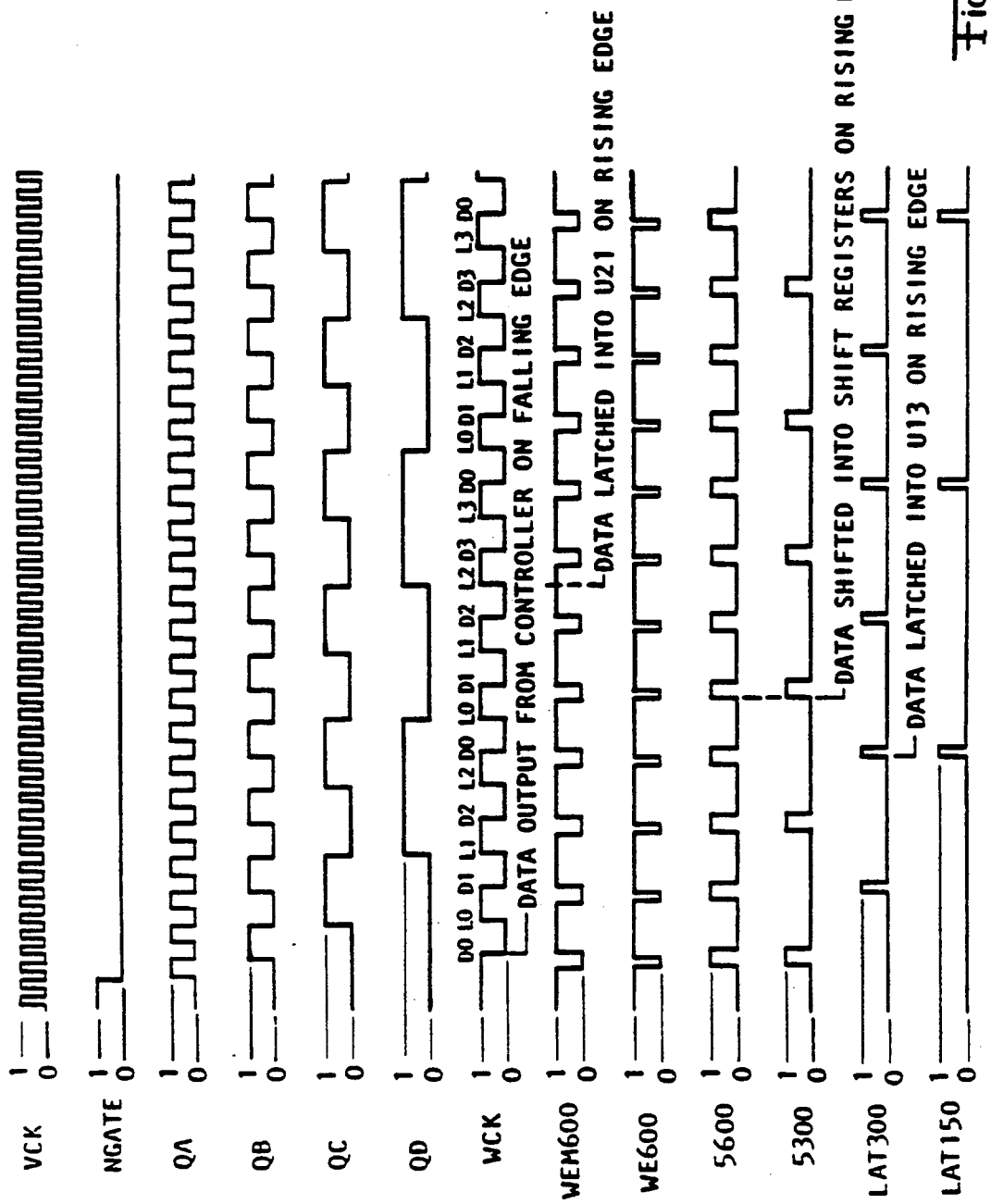

|   | 0 | 1 | 2 | 3 | 4 | 5 | 6 |
|---|---|---|---|---|---|---|---|
| 0 | 00 | 10 | 20 | 30 | 40 | 50 | 60 |
| 1 | 01 | 11 | 21 | 31 | 41 | 51 | 61 |
| 2 | 02 | 12 | 22 | 32 | 42 | 52 | 62 |
| 3 | 03 | 13 | 23 | 33 | 43 | 53 | 63 |
| 4 | 04 | 14 | 24 | 34 | 44 | 54 | 64 |
| 5 | 05 | 15 | 25 | 35 | 45 | 55 | 65 |
| 6 | 06 | 16 | 26 | 36 | 46 | 56 | 66 |

Lines Shift Bottom to Top

New Data Enter Here

Data Shifts Right to Left

Figure 7

APPARATUS AND METHOD FOR GRAY AND EDGE ENHANCEMENT

BACKGROUND OF THE INVENTION

1. Field of the Invention

The present invention relates generally to the control of output devices such as printers. In particular, the present invention relates to a circuit for improving laser printing of edges and gray shades.

2. Description of Related Art

Printers have long been used with computers to provide a written record of the data contained in the computer and memory devices. Laser printers are well known for producing quality printing at high speeds. Laser printers use a laser or diode that is selectively switched on and off to create an image of toner for deposition onto a sheet of paper. The switching of the laser is controlled by circuits that provide signals to switch the laser on and off as it scans line by line across the image to be deposited on paper. Heat is then applied to bond the toner to the paper.

Each printed image is composed of a thousands of pixels or dots very small in size. The size of the pixels is dependent on the resolution of the printer. Lasers with a resolution of 300 dots per inch (dpi) are known. Laser printers group pixels together to form various characters, numbers and graphical images.

One problem with prior art laser printers is their inability to produce shades of gray. One common method used by the prior art to produce shades of gray is dithering. Dithering produces shades of gray by grouping dots together, and printing various numbers of dots in the group to produce a single pixel with the shade of gray desired. For example, for sixteen shades of gray, the dots are group in sets of sixteen with four dots vertically and four dots horizontally. For a very light shade of gray only one pixel in the block of sixteen will be printed. For a very dark shade of gray fifteen pixels in the block of sixteen with be printed. Intermediate shades of gray are achieved by printing between 2 and 14 pixels in the block. While the dithering technique of the prior art is able to produce shades of gray, the resulting print has a very grainy appearance. Additionally, there is a significant loss in resolution by using the dithering method. For example, if the printer provides a resolution of 300 dpi, printing 16 shades of gray reduces the resolution to 75 dpi since four dots in both the vertical and horizontal direction are required to produce each pixel with gray shading.

The prior art has also attempted to produce shades of gray on laser printers with other methods. For example, attempts have been made to increase the dots per inch or control the laser directly. However, these approaches are also problematic because they require modifications to portions of the hardware such as the control board and laser. Additionally, the printing has a streaky appearance, and the laser is often difficult to control.

Another problem with the laser printers of the prior art is their inability to produce smooth diagonal lines. As noted above, all the images produced by laser printers are comprised of dots or pixels. Each pixel is substantially square in shape because they are a singe dot or a square area of dots. Thus, when diagonal lines are printed, they tend to have a step like appearance. For example, with 300 dpi printing there are visible steps when printing lines that are not strictly horizontal or vertical. The step like appearance is due to the finite size of the minimum pixel size width of the printer and the raster method often used to print pixels. The inability to produce diagonal lines also affects the printing of characters and symbols. Thus, there is a need to improve the printing of diagonal edges by laser printers.

Therefore, there is a need for an laser printer with improved edge resolution and an ability to print shades of gray.

SUMMARY OF THE INVENTION

The present invention is an apparatus and method for improving the quality of laser printing edges and shades of gray. In the preferred embodiment, the gray and edge enhancement circuit of the present invention comprises: a video clock counter, an input selector, a calibration selector, a mode selector, a decoding array, a register, memory and an address counter. The video clock counter, an input selector, a calibration selector, a mode selector are coupled to receive control signals from a laser print controller. The register is also coupled to the laser print controller to receive and store data. The gray and edge enhancement circuit modifies the data received from the laser print controller to smooth edges in the image sent to the laser. The present invention advantageously compares each pixel and surrounding pixels in an area seven pixels wide and seven pixels long to correction bit patterns. If a match is found the pixels are modified to enhance any edges defined by the pixels. The gray and edge enhancement circuit also includes an operating mode in which shades of gray may be printed with a resolution of 150 dpi. The circuit advantageously uses the decoding array to pulse width modify the input data to various shades of gray.

The method of the present invention preferably comprises the steps of: storing data to be printed, comparing the data to predetermined patterns for correction, correcting the data for edge enhancement and outputting the data to a laser printer.

BRIEF DESCRIPTION OF THE DRAWINGS

FIGS. 6(A) and 6(B) are timing diagrams for the printing modes of the present invention;

FIG. 7 is a diagram showing the pixel cell assignment for a preferred embodiment of the gray and edge enhancement circuit of the present invention.

DETAILED DESCRIPTION OF PREFERRED EMBODIMENTS

Figure 1:
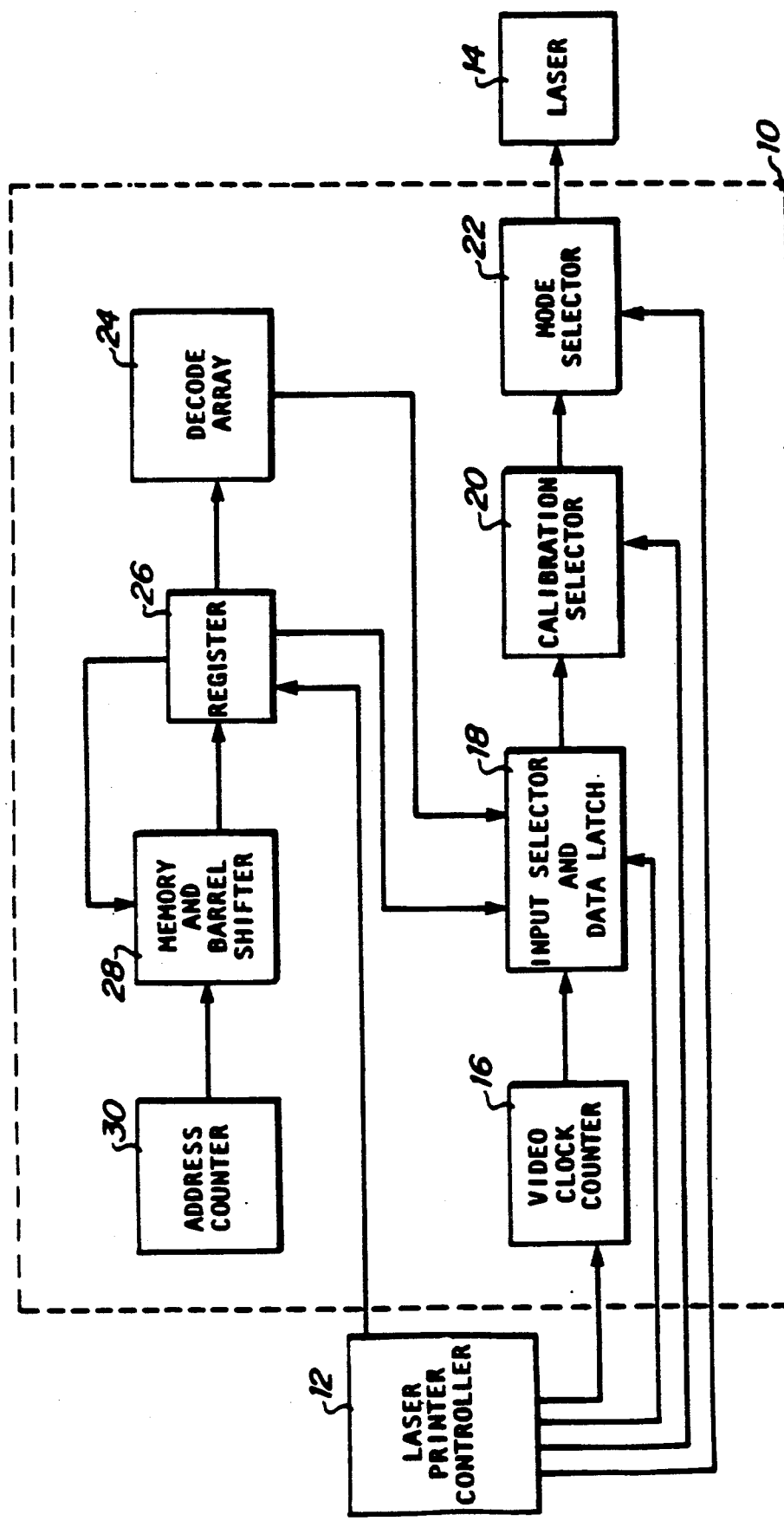
FIG. 1 is a block diagram of a preferred embodiment for a gray and edge enhancement circuit of the present invention.

Referring now to FIG. 1, a block diagram of a preferred embodiment of a gray and edge enhancement circuit 10 of the present invention is shown. The present invention preferably comprises a video clock counter 16, an input selector and latch 18, a calibration selector 20, a mode selector 22, a decoding array 24, a register 26, a memory and barrel shifter 28, and an address counter 30. The gray and edge enhancement circuit 10 is coupled between laser printer controller 12 and laser 14. The gray and edge enhancement circuit 10 receives control signals and data from laser printer controller 12. The gray and edge enhancement circuit 10 modifies the data and outputs it in a form suitable to drive laser 14 to print in a variety of modes.

In the preferred embodiment, the present invention provides four modes of printing including: standard 300 dpi, standard 600 dpi, gray mode and enhancement mode. In standard 300 dpi printing mode (MODE0=0, MODE1=0), the output video clock signal (*WCK) is set for 300 dpi, and the input laser data is sent directly to the output. The edge enhancement and gray circuits are bypassed in this mode. In standard 600 dpi printing mode (MODE0=1, MODE1=0), the output video clock signal (*WCK) is set for 600 dpi printing, and the input laser data is sent directly to the output. The edge enhancement and gray circuits are bypassed in this mode. This mode produces standard 600 dpi output in the horizontal direction and 300 dpi output in the vertical direction. In the 150 dpi gray mode (MODE0=0, MODE1=1), the output video clock signal (*WCK) is set for 600 dpi printing and the incoming data is processed by the calibration selector 20. The input data is received in groups of 4, 600 dpi pixels and converted into an output of 1, 150 dpi gray pixel. The calibration signals (CAL0 to CAL2) must be set to output one of the gray pattern outputs from the Pulse Decode PROM 44. In 300 dpi edge enhancement mode (MODE0=1, MODE1=1), the output video clock (*WCK) is set for 300 dpi printing and the incoming data is processed by the edge enhancement circuitry. For edge enhancement, the calibration signals (CAL0 to CAL2) must be set to output one of the edge enhancement pattern outputs from Pulse Decode PROM 44. The enhancement mode provides printing at 300 dpi with edge smoothing.

Figure 2:
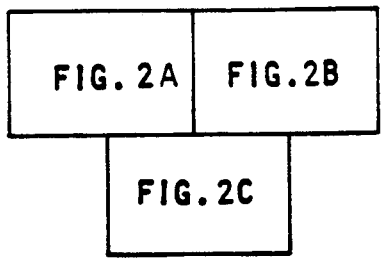
FIGS. 2A, 2B and 2C are schematic diagrams of a preferred embodiment for the video clock counter, the input selector and data latch, and calibration selector.
Figure 3:
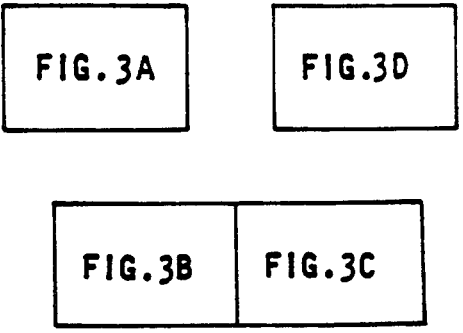
FIGS. 3A, 3B, 3C and 3D are schematic diagrams of a preferred embodiment for the timing control logic and the register array of the present invention.

The video counter 16 is coupled to printer controller 12 to receive a VCK signal. The video counter 16 provides the clocking signals used throughout gray and edge enhancement circuit 10. As shown in FIG. 2, video counter 16 is preferably a 4-bit binary counter 32 and a plurality of inverters 34. For example, video counter 16 may be a 74LS161. The outputs of counter 32 are coupled to calibration selector 20 and used to pulse width modulate the data signal from printer controller 12 to produce gray shades. The video counter 16 is also used to divide the 12.3 Mhz VCK clock signal from printer controller 12 to the proper frequency for each printing mode. For example, the VCK signal is divided by 4 to produce the S600 signal used in the 600 dpi mode and divided by 8 to produce the S300 signal used in the 300 dpi mode. As illustrated in FIG. 3, timing control logic is used to produce the S600 and S300 signals as well as the Latch signal as will be easily understood by those skilled in the art.

As illustrated in FIGS. 1 and 2, input selector 18 receives data from decoding array 24 and register 26 on lines RD0–RD3 and GD3–GD6, respectively. The input selector 18 also receives control signals, MODE0 and MODE1, from printer controller 12. The input selector 18 stores data from register 26 or decoding array 24 that is to be output to laser 14. The input selector 18 also selects the data output to laser 14 in response to the MODE0 and MODE1 control signals. In the preferred embodiment, input selector 18 comprises a multiplexer 36 and a register 38. For example, multiplexer 36 may be four 2-1 multiplexers and register 38 may be four D flip-flops. The multiplexer 36 either outputs the four bits from register 26 or the four bits from decoding array 24. The output of multiplexer 36 is controlled by the select input which is coupled the output of Exclusive-Or gate 40 and inverter 42 which perform a logical exclusive nor function on the MODE1 and MODE0 signals. The output of each 2-1 multiplexer is coupled to the input of a respective input of a D flip-flop. The data selected is then latched into the D flip-flops that comprise register 38. The outputs of register 38 are coupled to calibration circuit 20 to provide the latched data to calibration circuit 20.

The calibration circuit 20 is also shown in FIG. 2. Calibration circuit 20 preferably comprises an programable read only memory (PROM) 44 and a multiplexer 46. In an exemplary embodiment, PROM 44 is an 74S472 chip and multiplexer 46 is an 8-1 multiplexer such as a 74LS151. The address inputs of PROM 44 are coupled to the outputs of counter 32 and the outputs of register 38. The outputs of PROM 44 are coupled to the inputs of multiplexer 46. Multiplexer 46 also receives calibration signals, CAL0, CAL1 and CAL2 from printer controller 20. These calibration signals are coupled to the selection inputs of multiplexer 46. Based on the calibration signals input, one of the eight outputs of PROM 44 will be output by multiplexer 46.

PROM 44 stores both the outputs for producing shades of gray and the correction data for edge enhancement. The four highest outputs (Q5–Q8) provide gray patterns and the four lower outputs (Q1–Q4) provide edge enhancement patterns. When operating in gray mode, PROM 44 pulse width modifies the data received from printer controller 12. The present invention passes the data from printer controller 12 through register 26 to input selector 18. The data is then stored in register 38 of the input selector 18 and used to address PROM 44. Corresponding pulse width data is stored at each location in PROM 44 addressed by register 38. An example of an assembly file and PROM data for PROM 44 is shown in Appendix A. The data from printer controller 12 is sent to and stored by input selector 18 in groups of four bits. The four bits are converted to pulse width data by PROM 44 and then the pulse width video is sent to laser 14 at 150 dpi. As noted above, PROM 44 outputs four signals for producing shades of gray. The calibration settings normalize the controller circuit 12 with different printers. Each of the gray PROM outputs (Q5–Q8) preferably has different pulse widths programed for each gray level. The user may select from among the four PROM outputs to provide the best uniform gray scale for the particular printer being used. The present invention programs the variances in the gray scale for PROM 44 outputs with Q5 being the lightest shade of gray and Q8 being the darkest shades of gray.

When operating in the edge enhancement mode, PROM 44 also provides corrections to smooth edges and reduce the step like appearance of diagonal lines.

PROM 44 corrects the output to laser 14 in response to a correction signal sent by the decoding array 24 and stored in register 38 of input selector 18. If decoding array 24 determines that edge enhancement is necessary, then a code is output by decoding array 24 and used to address PROM 44. PROM 44 outputs the correcting pixel pattern stored in the location addressed by the data from the decoding array 24. If no correction is required, PROM 44 outputs the pixel data unchanged (i.e., either full on pixel or a full off pixel). Like operation in the gray mode, the calibration settings in offer a choice of correction settings. For example, outputs Q2-Q4 provide correction for thick, medium and thin lines respectively.

The output of multiplexer 46 of calibration selector 20 is coupled to an input of mode selector 22. The mode selector 20 couples either a 300 dpi or 600 dpi clock signal and a data stream to the input of laser 14 in response to the control signals received. Mode selector 22 preferably comprises two 4-1 multiplexers. The data inputs of the first multiplexer are coupled to receive the S300 and S600 signals. The S300 signal is coupled to two data inputs and the S600 signal is coupled to two data inputs of the first multiplexer. The output of the first multiplexer provides the clock signal used by laser 14 and register 26. The second multiplexer has two data inputs coupled to register 26 for sending data received from printer controller 12 directly to laser 14 in the standard 300 dpi and standard 600 dpi modes. The two remaining data inputs of the second multiplexer are coupled to the output of multiplexer 46 of calibration selector 20 to output the data from PROM 44 in the gray or enhancement modes. The mode selector 20 has two control inputs which are coupled to receive the MODE0 and MODE1 signals from the printer controller 12. The control inputs control the output of both first and second multiplexer.

The present invention advantageously implements edge enhancement by comparing the pixel data to be output to laser 14 to predetermined patterns of pixels. If the output data matches the predetermined patterns of pixel, then the present invention modifies the output data to smooth the edges. If no match is found the data is passed to laser 14 unchanged. The present invention compares the output data to predefined pixel patterns using a window of predefined size. The window is preferably 7 pixels wide by 7 pixels long which provides three lines of pixels above and below the pixel of interest, as well as three columns of pixels on either side of the pixel of interest. A preferred embodiment for the data window cell is illustrated in FIG. 7. As shown in FIG. 7, the new data enters the cell from the lower right hand cell denominated 6,6. As additional data enters into the register, the data shifts from left to right. As a new line is entered, the lines shift upward and the cells in line 0 are removed from the window. While the preferred embodiment of the present invention uses a window 7 pixels by 7 pixels, it should be understood that the present invention may also implement edge enhancement with windows in a variety of other sizes.

Referring now to FIG. 3, a preferred embodiment of register 26 is illustrated. Register 26 holds the window of data that is compared to the predefined patterns of pixels to determine which pixels to modify to smooth the edges of the image. Register 26 preferably comprises of plurality of shift registers 50-56. For example, the shift registers 50-56 may be 74LS164 8-bit parallel out serial shift registers. Shift register 50 represents the lowest line in the cell matrix of FIG. 7. Shift registers 51-56 represent each additional line moving up to the top line of the cell matrix represented by shift register 56. The serial input of shift register 50 is coupled to printer controller 12 to receive new data to be sent to laser 14. The least significant bit of the shift register 50 represents the 6,6 position in the cell matrix of FIG. 7. As new data is shifted in shift register 50, the same column pixels for the six previous lines will be shifted into shift registers 51-56 as represented in FIG. 7. The data inputs of the remaining shift registers 51-56 are coupled to memory 28 to receive the pixels directly above the new pixel being input to position 6,6. The remaining shift register 51-56 receive the data for column 6 of FIG. 7 from memory 28. The outputs of the registers 50-56 are preferably coupled to the decoding array 24 for comparison to the predefined patterns of pixels stored therein. As shown in FIG. 3, some outputs are coupled to the inputs of multiplexer 58. Multiplexer 58 preferably comprises four 2-1 multiplexers. The output of multiplexer 58 is coupled to the inputs of multiplexer 36 of input selector 18. Multiplexer 58 couples the outputs of shift register 53 and shift register 56 to input selector 18 for transmitting the data directly to laser 14 without edge enhancement or gray shading in the standard 300 and 600 dpi modes.

Figure 4:
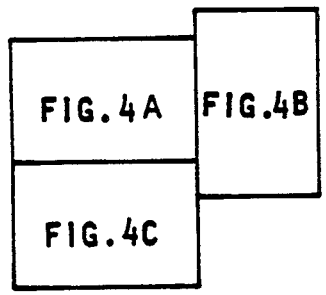
FIGS. 4A, 4B, 4C are schematic diagrams of a preferred embodiment for the address counter and memory of the present invention.

In FIG. 4, a preferred embodiment for the address counter 30 is shown. The address counter 30 is preferably a plurality of 4-bit binary counters 60, 62 and 64. Address counter 30 is incremented once for each new output bit that is received from printer controller 12. For a standard size 8.5 inch sheet of paper there are 2550 pixels per line. Address counter 30 preferably has 12 bits (i.e., three 4-bit binary counters) so that 4096 pixels can be addressed to provide a unique memory address for each pixel in the line. At the start of each new line, address counter 30 is reset by the HGATE signal from printer controller 12. The outputs of address counter 30 are coupled to the address inputs of a memory 66 as shown in FIG. 4.

The memory and barrel shifter 28 is also shown in FIG. 4, and comprises memory 66, tristate drivers 68 and a register 70. For example, memory 66 may be a 4k-byte memory, the tristate drivers 68 may be 74LS244s and the registers 70 may be 74LS374. Memory 66 stores the seven lines of pixel data for comparison to the predefined patterns in decoding array 24. The input/output pins of memory 66 are coupled to the respective outputs of the tristate drivers 68 and to the inputs of the respective registers 70. The inputs of the tristate drivers 68 are coupled to the outputs of the registers 70, however, the outputs of the registers are offset by one line to form a barrel shifter for shifting the data in memory 60 as new data is input, as well known to those skilled in the art. The outputs of register 70 are also coupled to the shift registers 50-56 as indicated.

Figure 5:
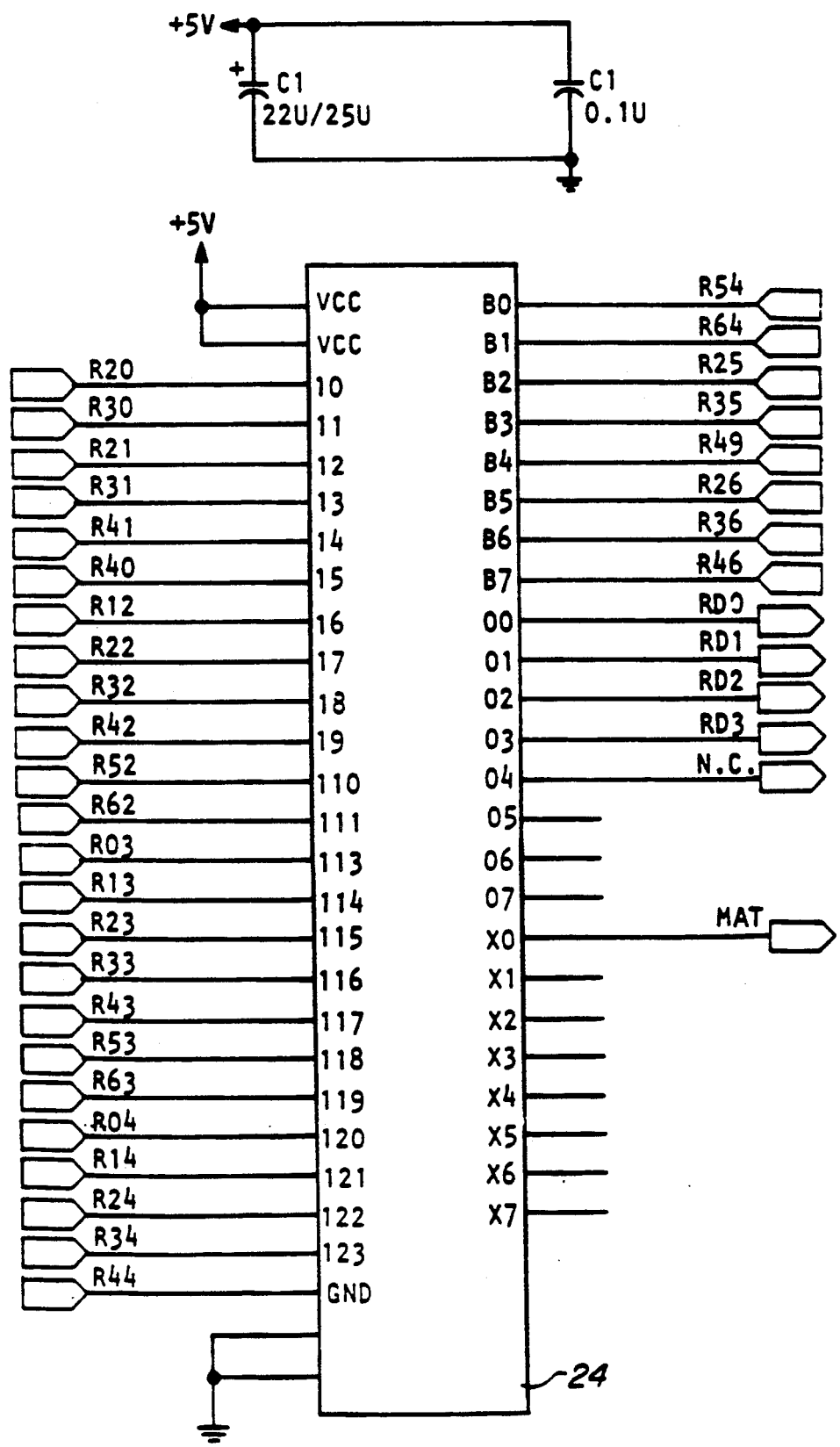
FIG. 5 is a schematic diagram of a preferred embodiment for the decoding array.

Referring now to FIG. 5, the preferred embodiment for decoding array 24 is shown. The decoding array 24 preferably comprises a programable logic array. The connection of an exemplary PLA to register 26 and input selector 18 is illustrated in FIG. 5. The data patterns smoothed by the preferred embodiment of the present invention and the equations for programming the PLA are detailed in Appendix B. To reduce the number of address inputs required, the present invention compares the output data in the window for vertical and horizontal patterns for matches. During the first half of the 300 dpi pixel time the circuit compares the data for vertical pattern matches and in the second half of the circuit compares the data for horizontal matches. For vertical pattern matches, decoding array 24 compares cell patterns 3 cells wide and 7 lines high. For horizontal pattern matches, decoding array 24 compares cell patterns 7 cells wide and 3 lines high. This significantly reduces the number of comparisons that the decoding array 24 must make and reduces the size of the PLA. The decoding array 24 monitors the outputs of register 26. If the decoding array 24 finds a pattern match for the output of register 26, the decoding array 24 outputs a 4 bit correction pattern on lines RD0–RD3 and asserts the match signal. The outputs of the decoding array 24 are coupled to multiplexer 36 of input selector 18. The output of decoding array 24 is used to address PROM 44 which provides the appropriate bit pattern to smooth the edges of the image being printed.

Figure 6B:
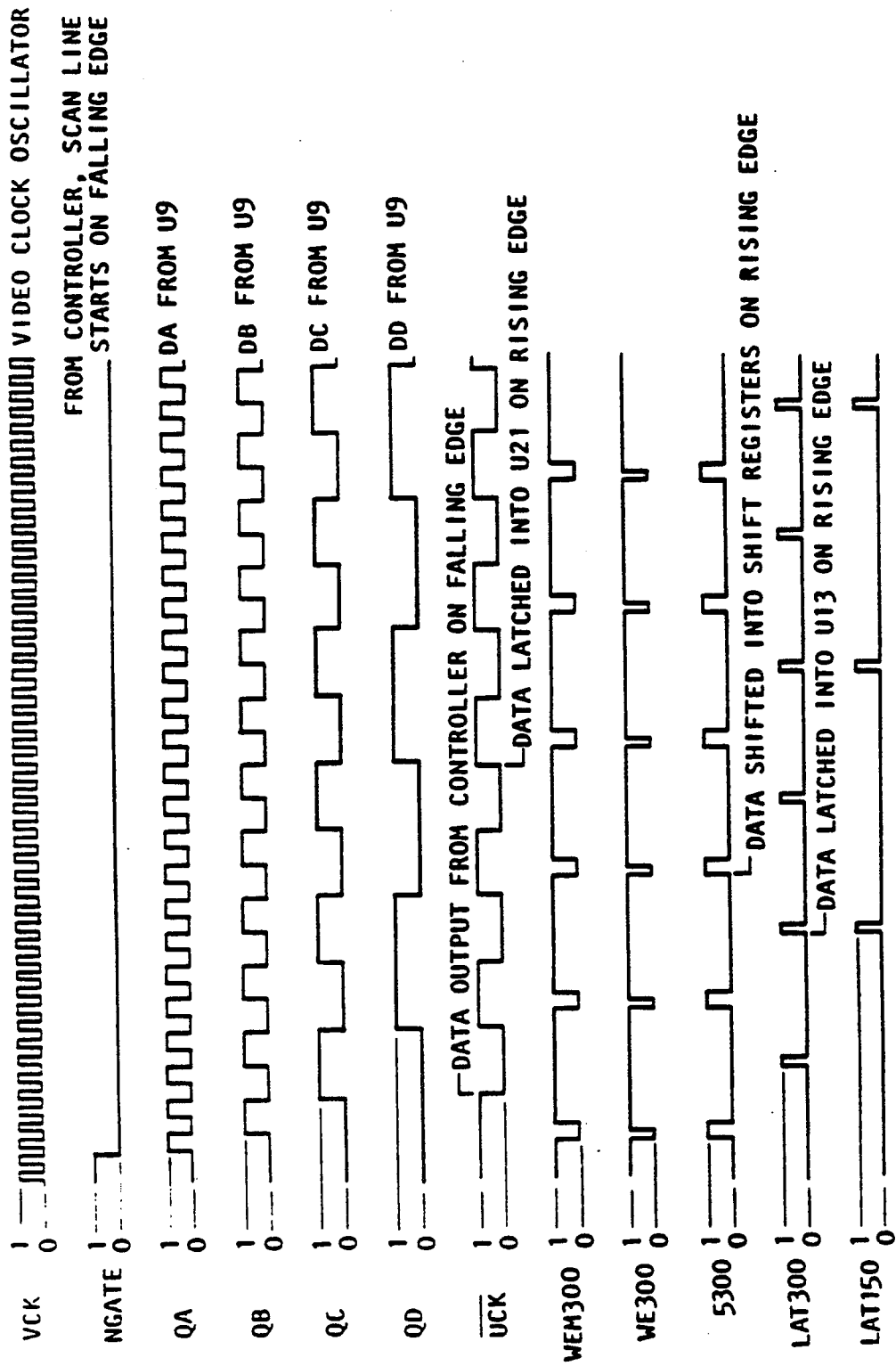
Figure 8A:
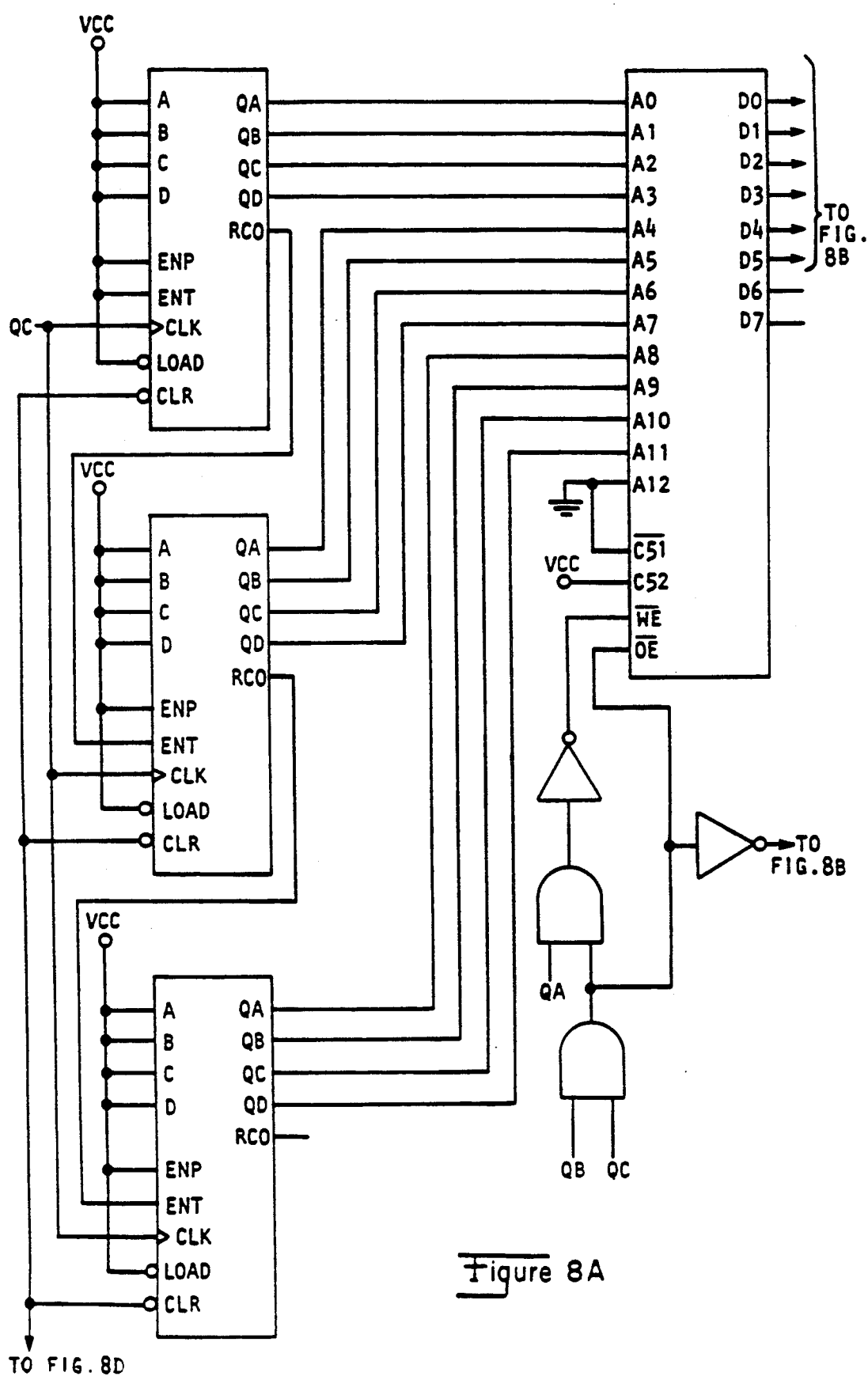
Figure 8B:
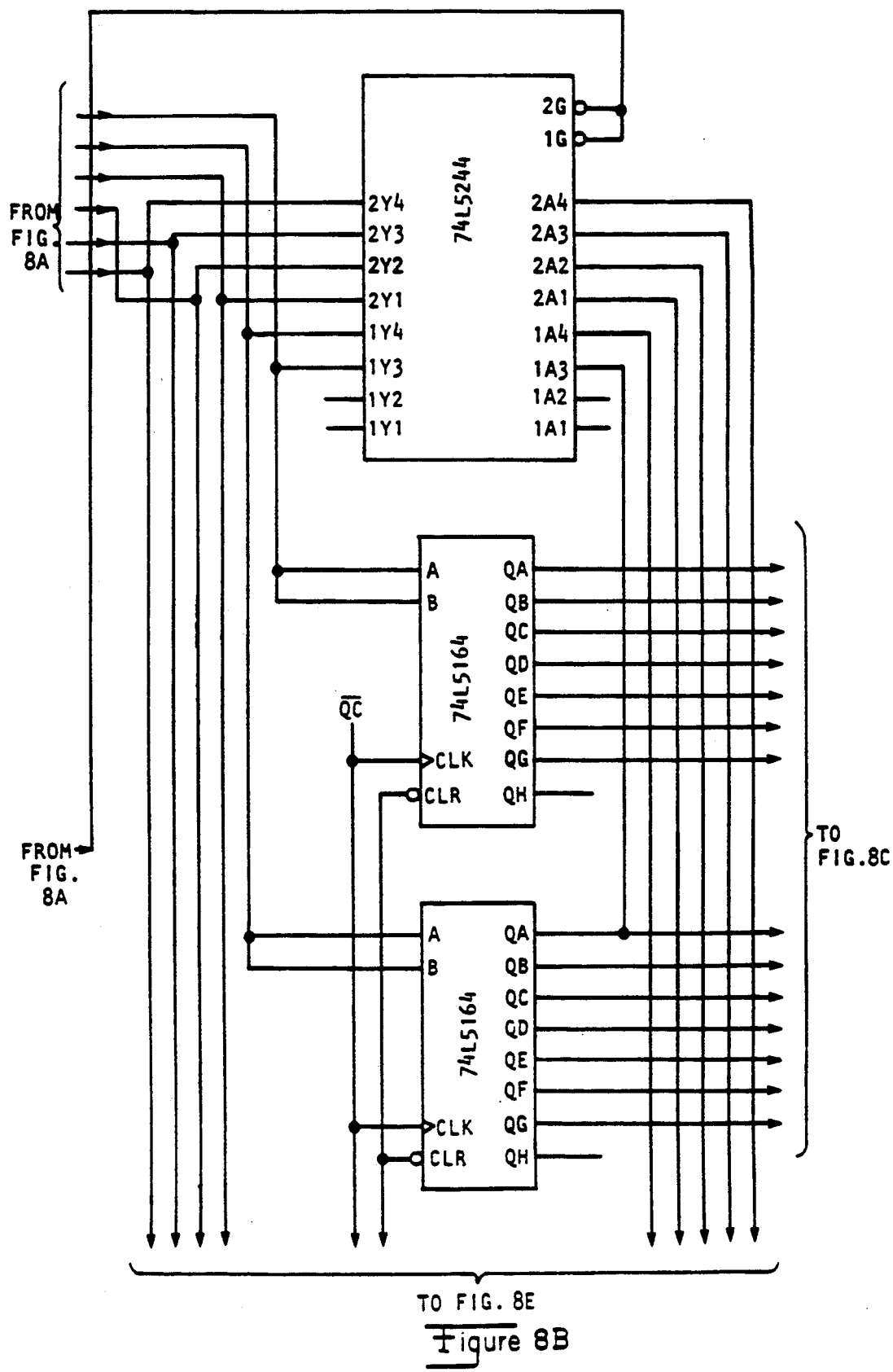
Figure 8C:
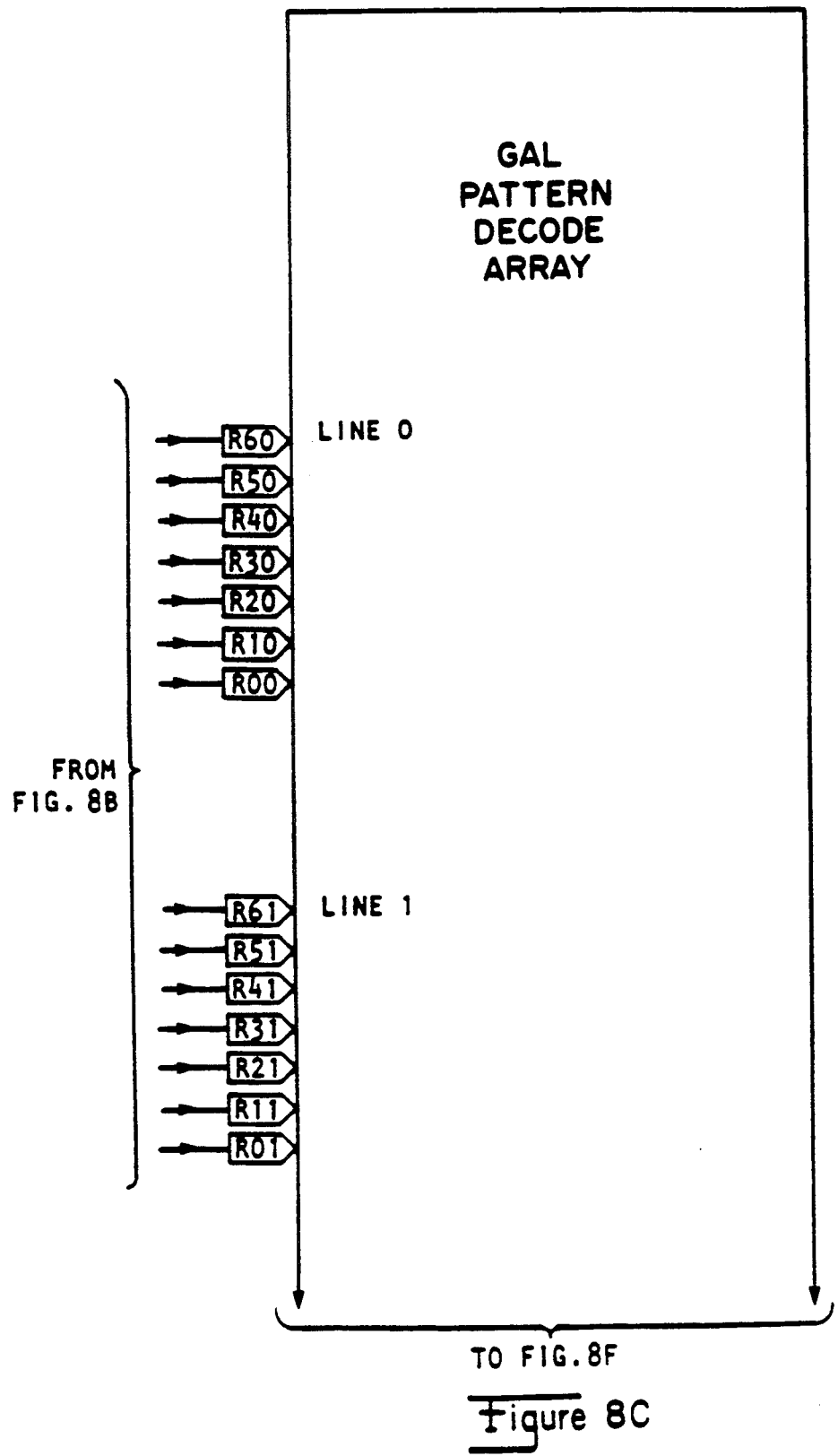
Figure 8D:
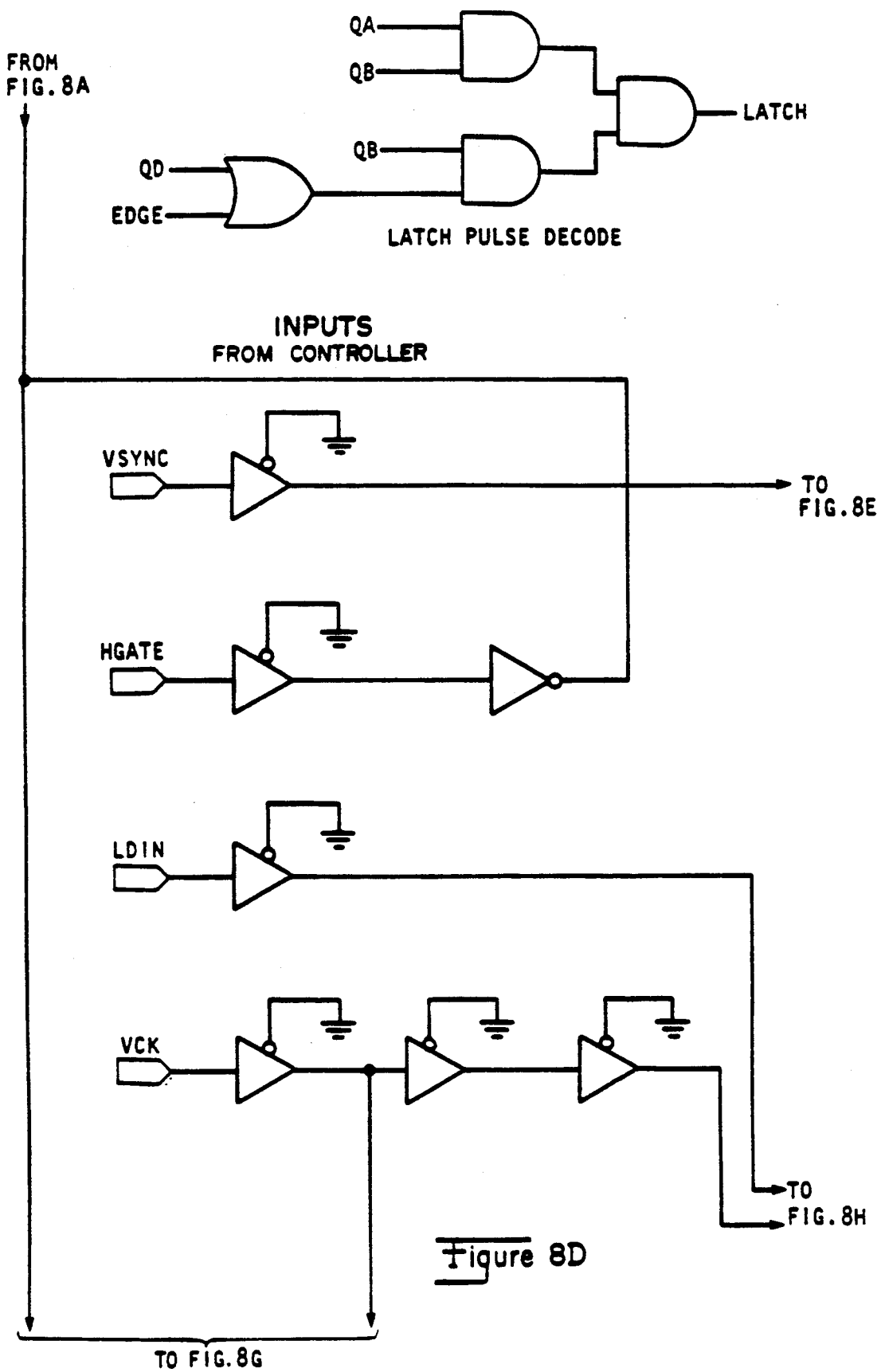
Figure 8E:
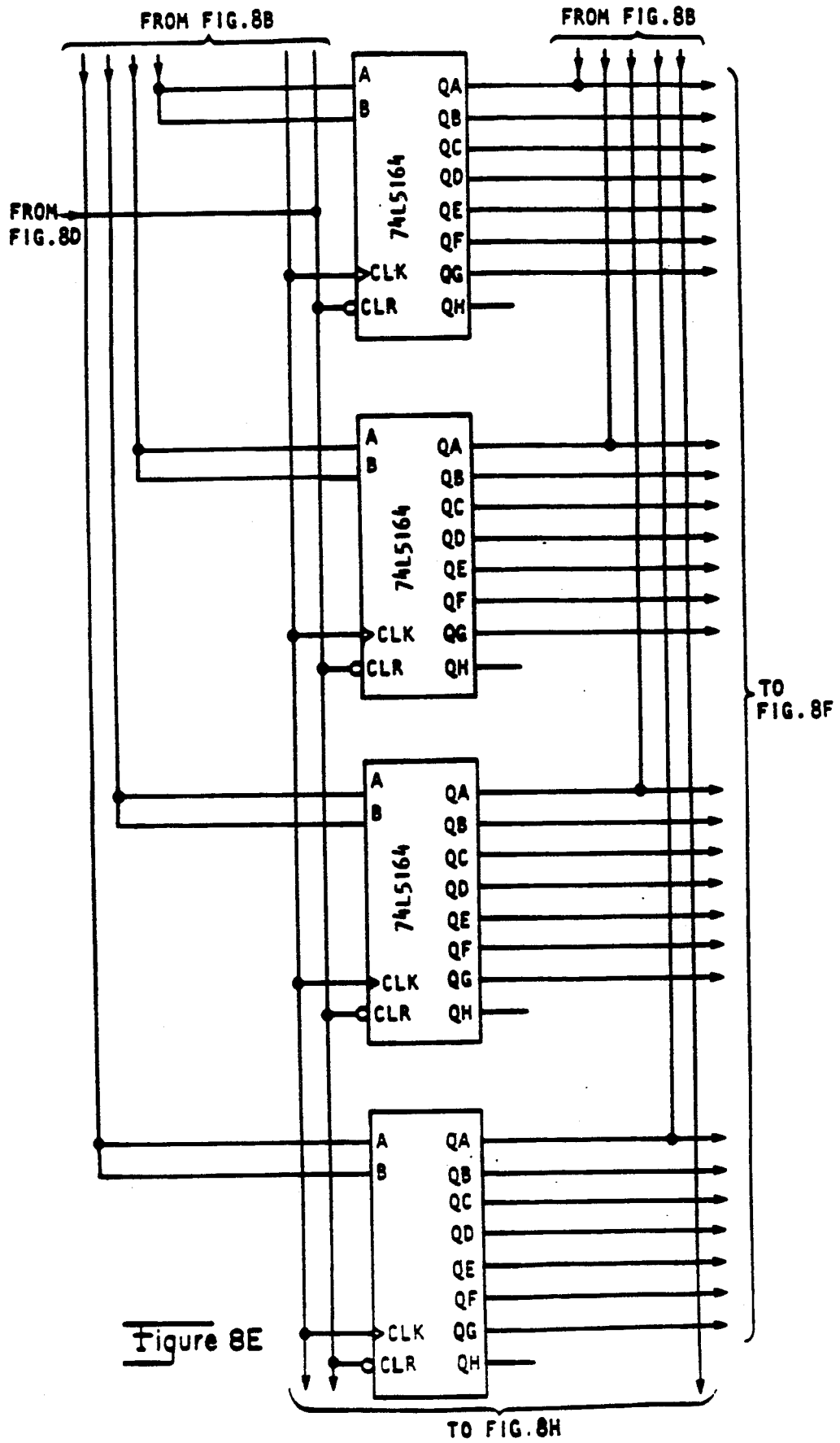
Figure 8F:
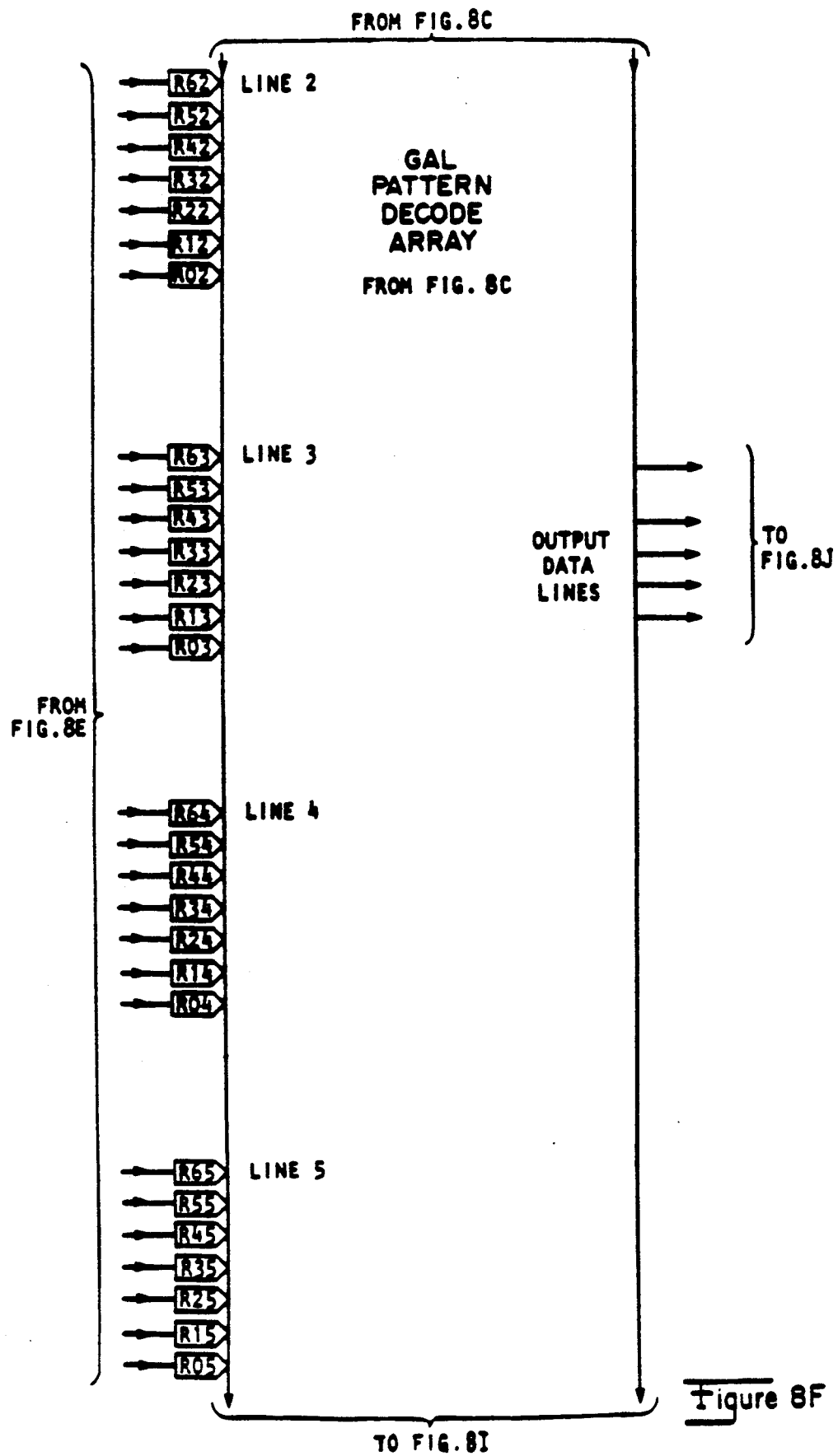
Figure 8G:
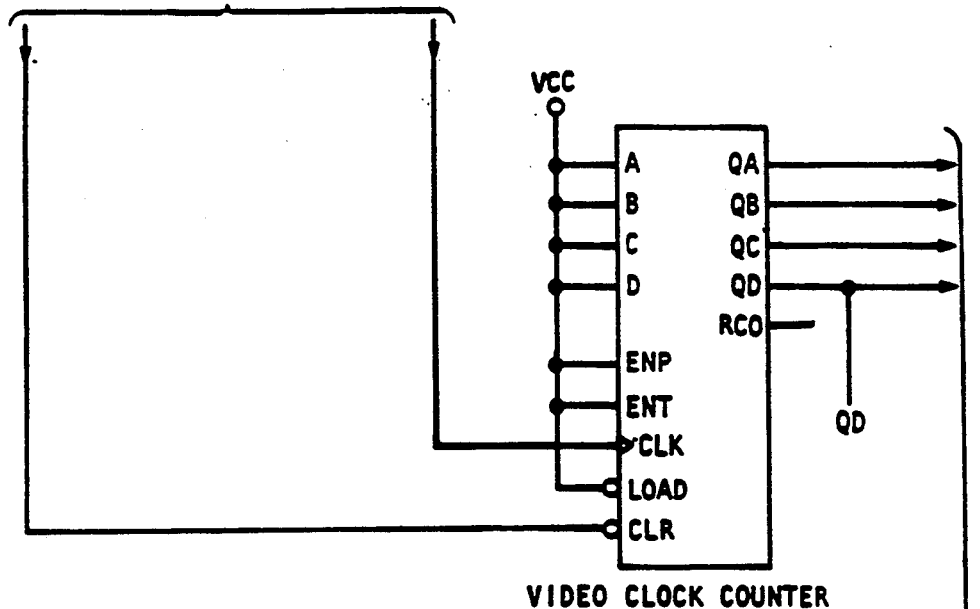
Figure 8G:
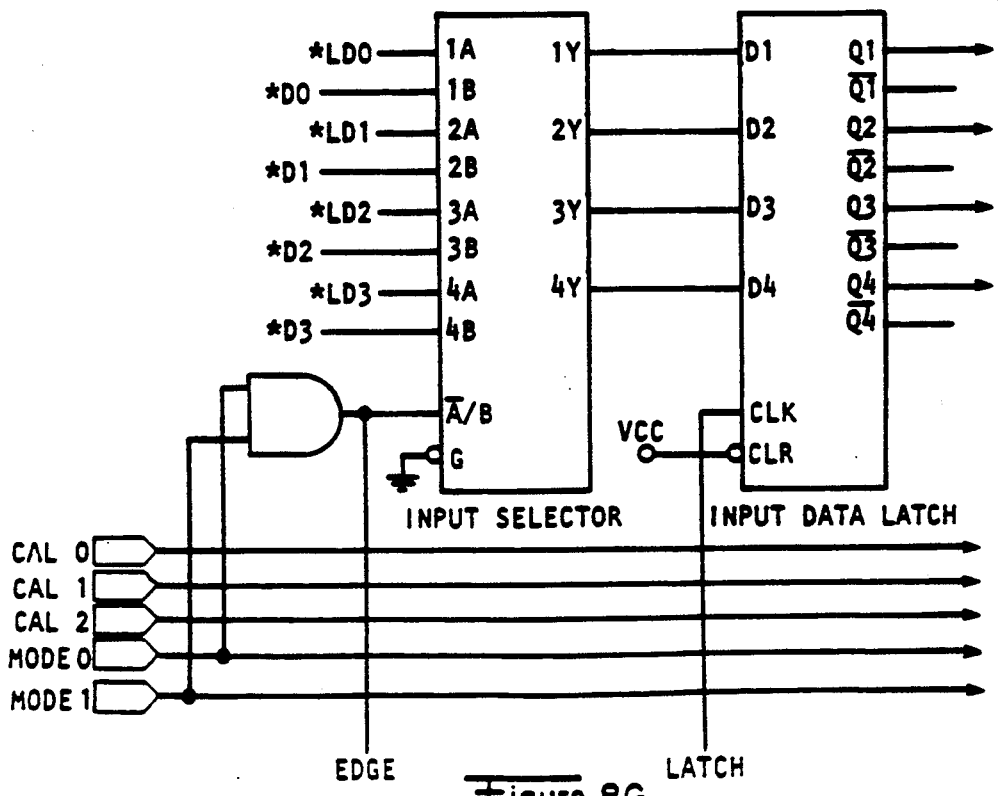
Figure 8H:
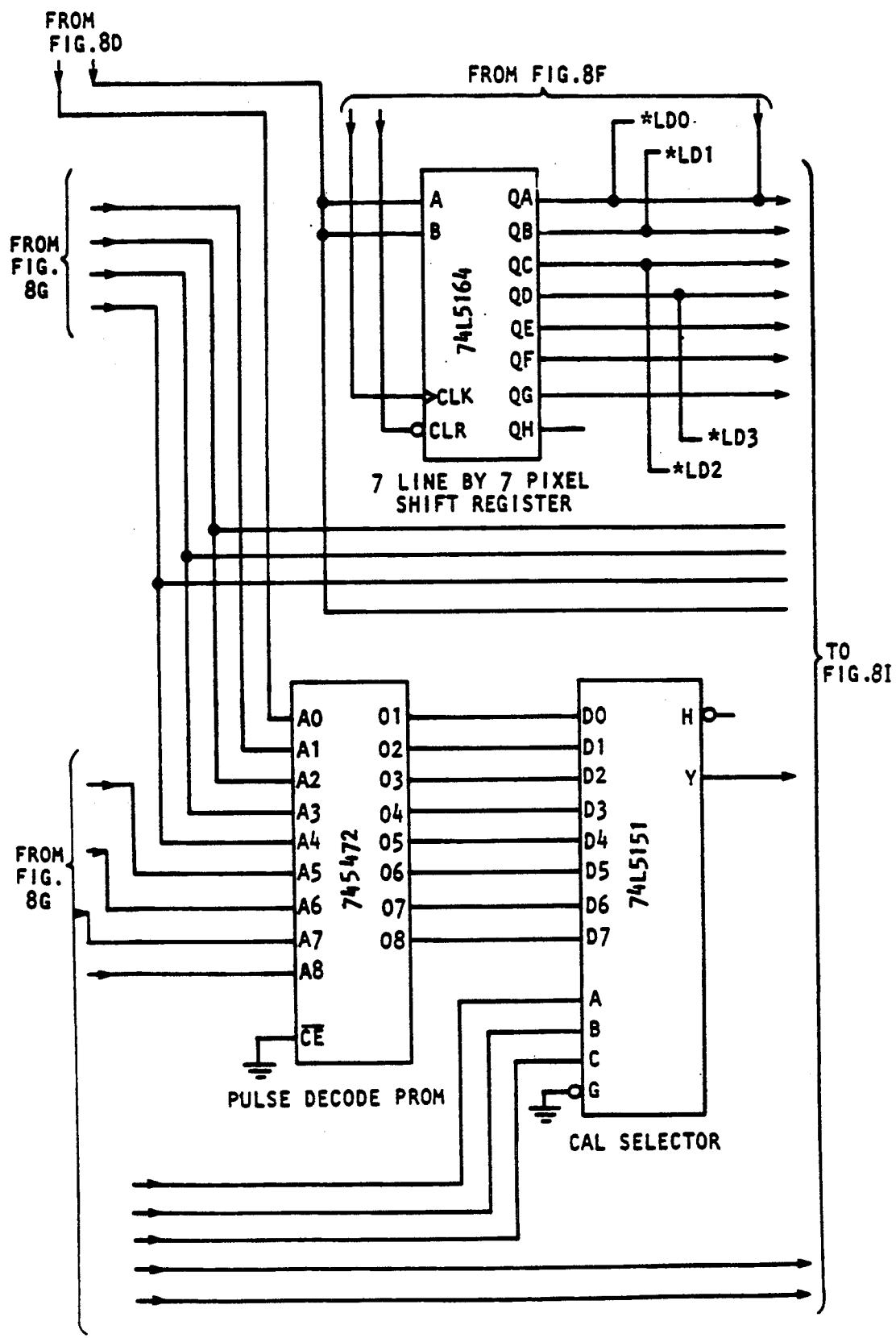
Figure 8I:
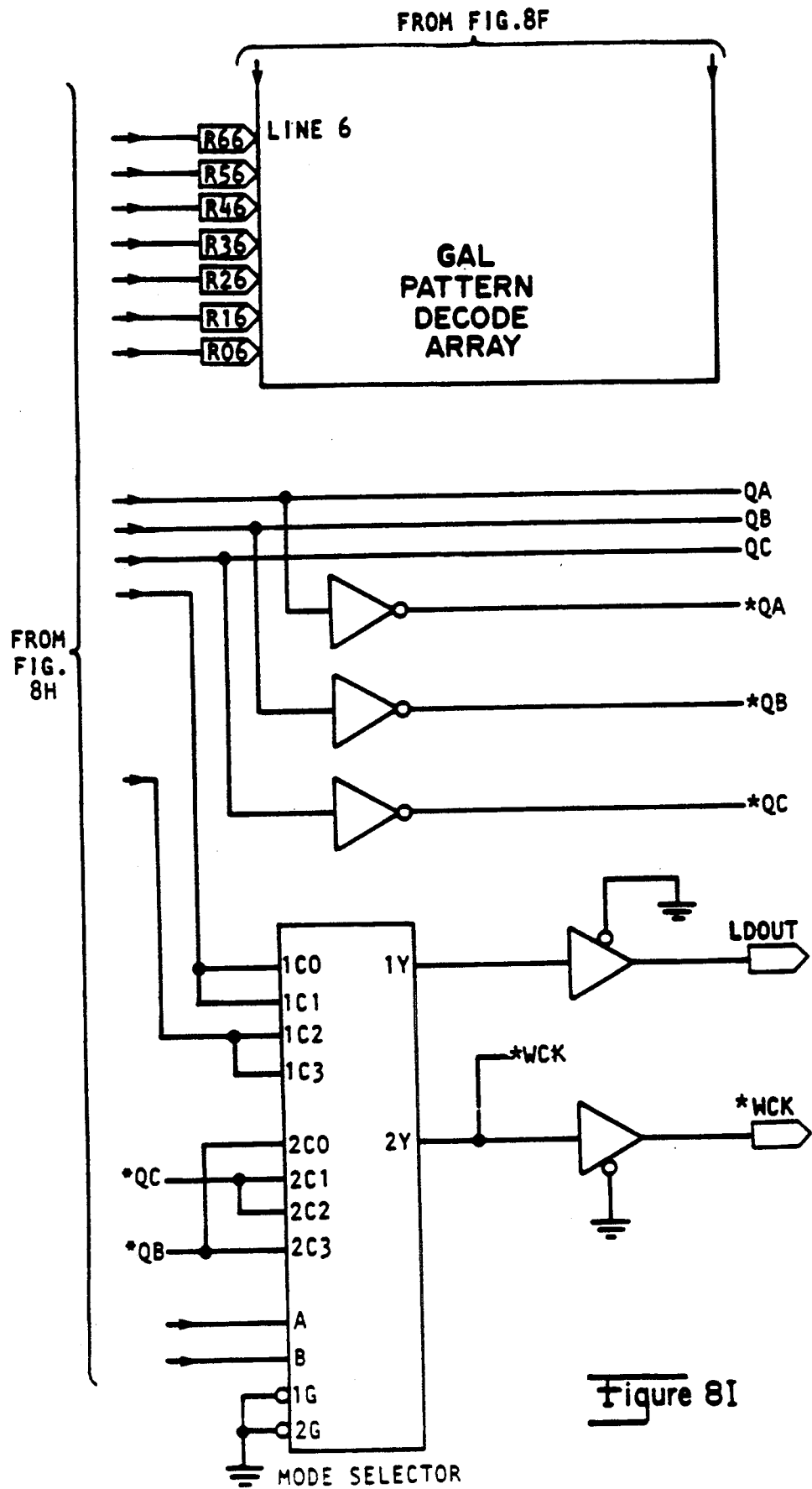
Figure 8J:
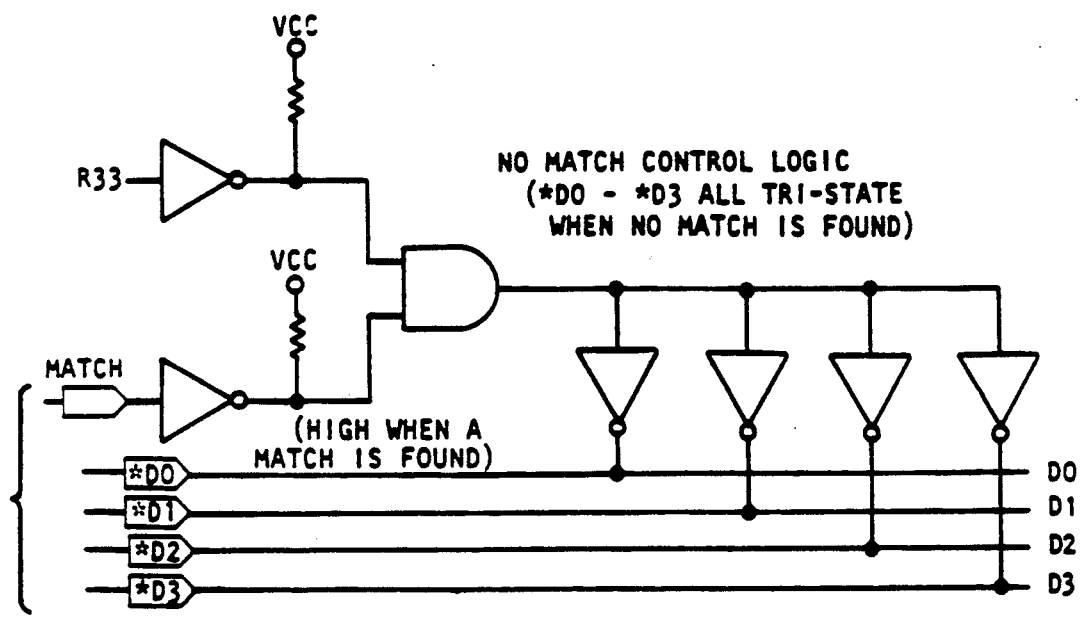

FIG. 6 shows a timing diagram for the operation of the present invention in the four modes described above. The present invention shifts data in from printer controller 12 into the gray and edge enhancement Circuit 10 at a rate of 600 dpi, regardless of the mode that the data is being sent to laser 14. This does not affect the standard 600 dpi mode and the gray modes, however, for the modes which normally provide data to the laser at 300 dpi, printer controller 12 is modified to double each 300 dpi pixel and send the doubled data to the present invention at 600 dpi.

Figure 8:
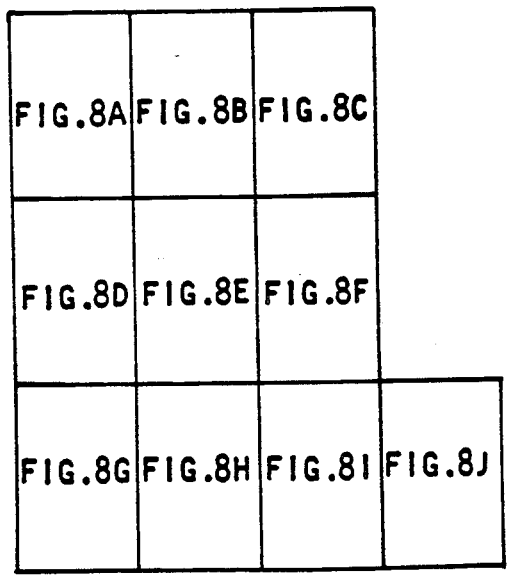
FIGS. 8A, 8B, 8C, 8D, 8F, 8G, 8H, 8I and 8J are schematic diagrams of an alternate embodiment of the present invention.
Figure 2A:
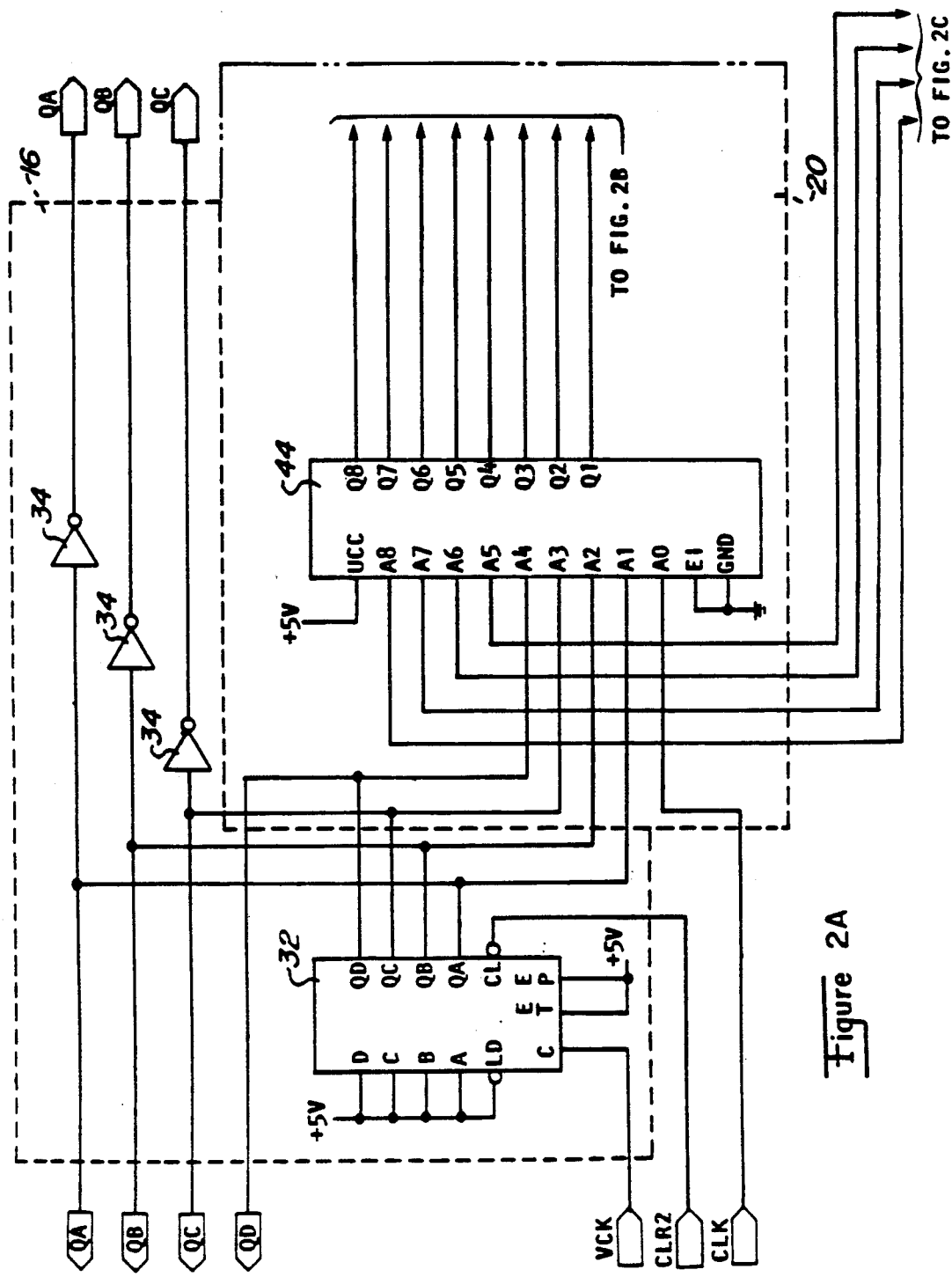
Figure 2B:
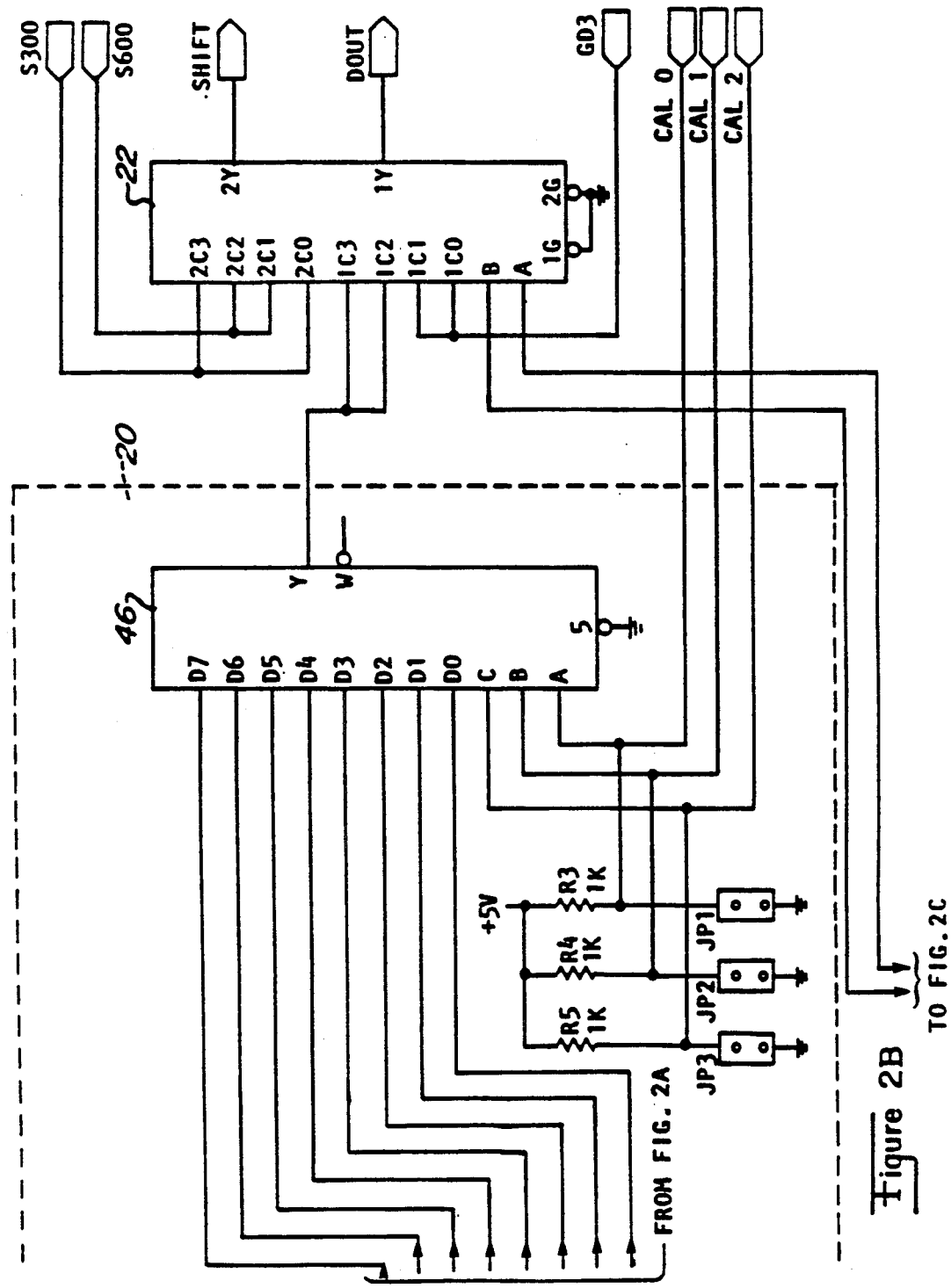
Figure 2C:
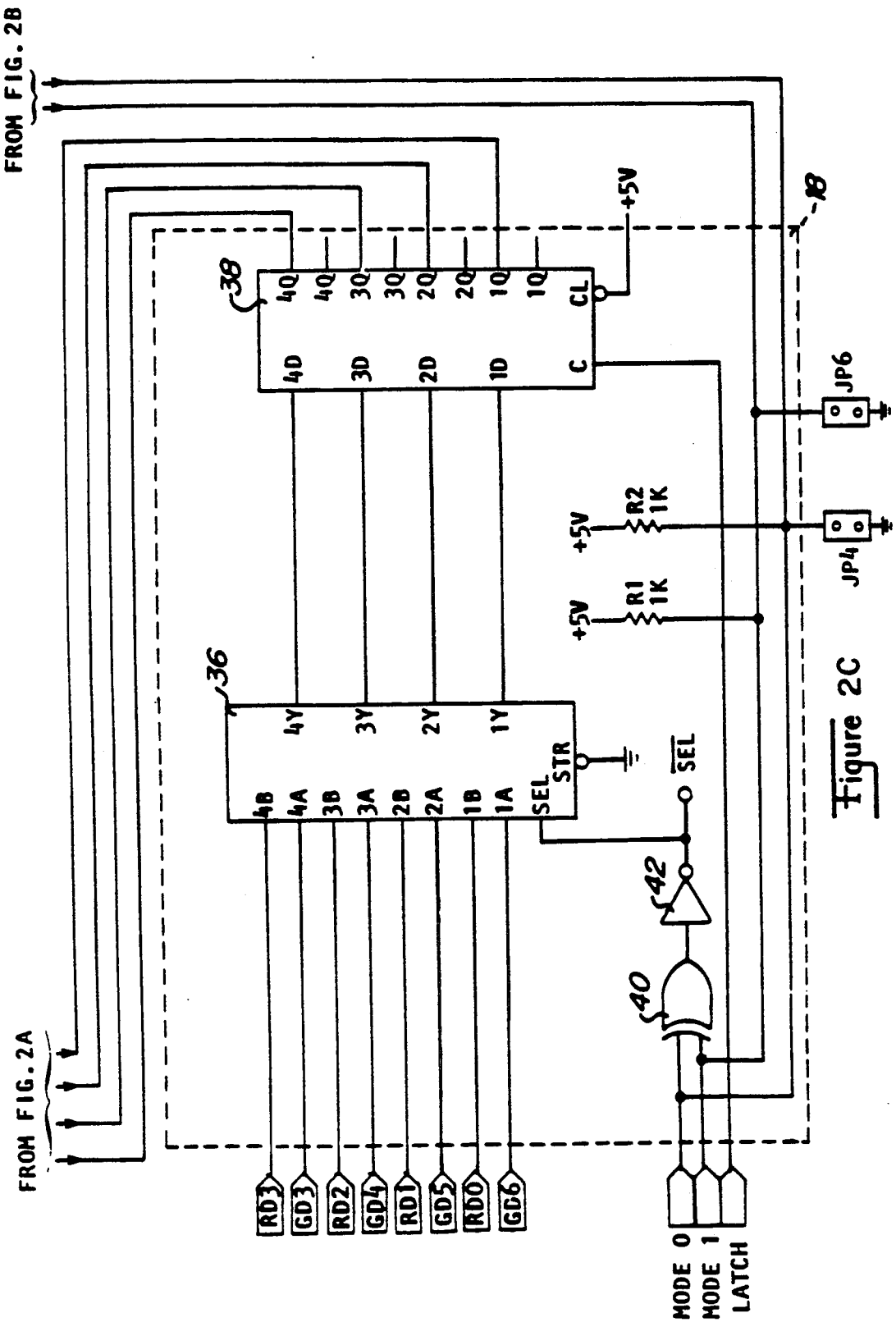
Figure 3A:
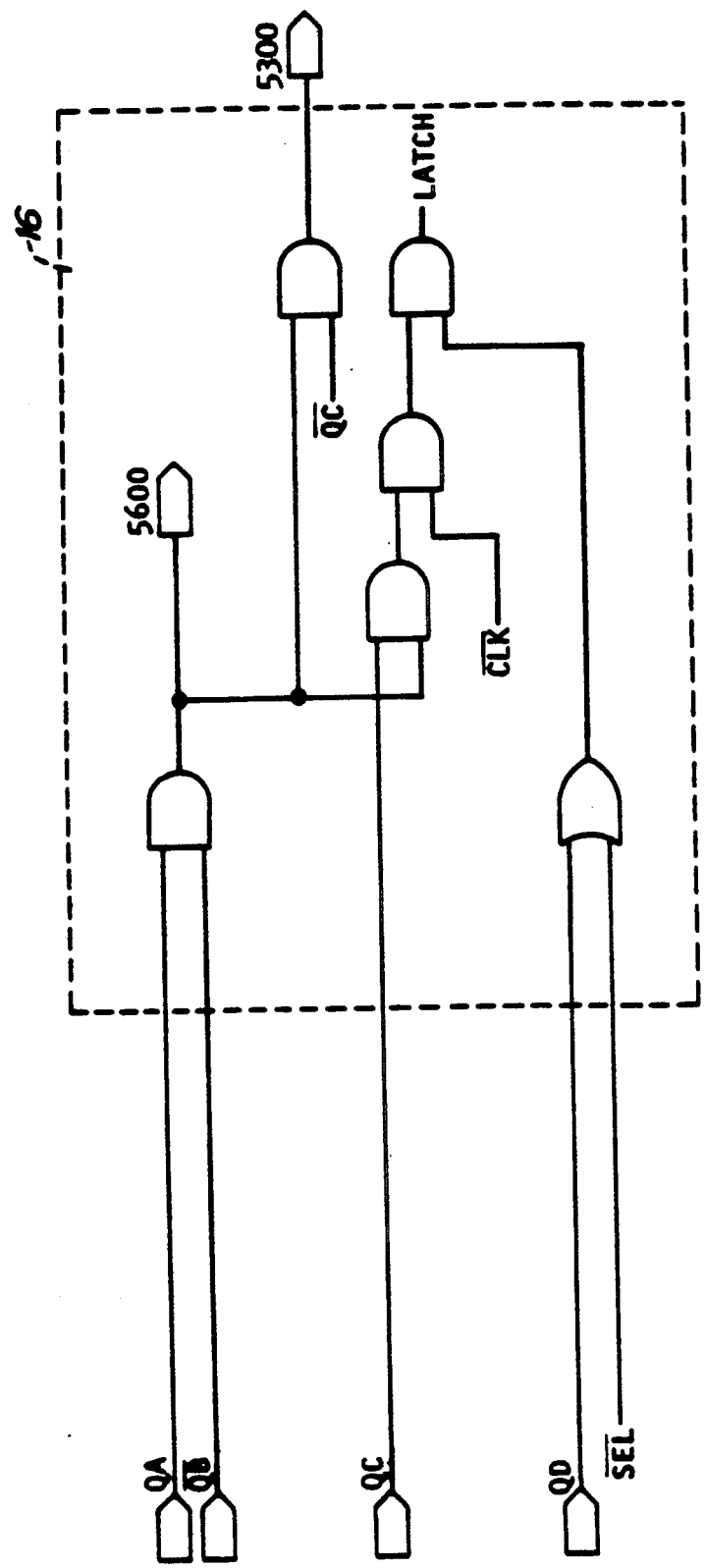
Figure 3B:
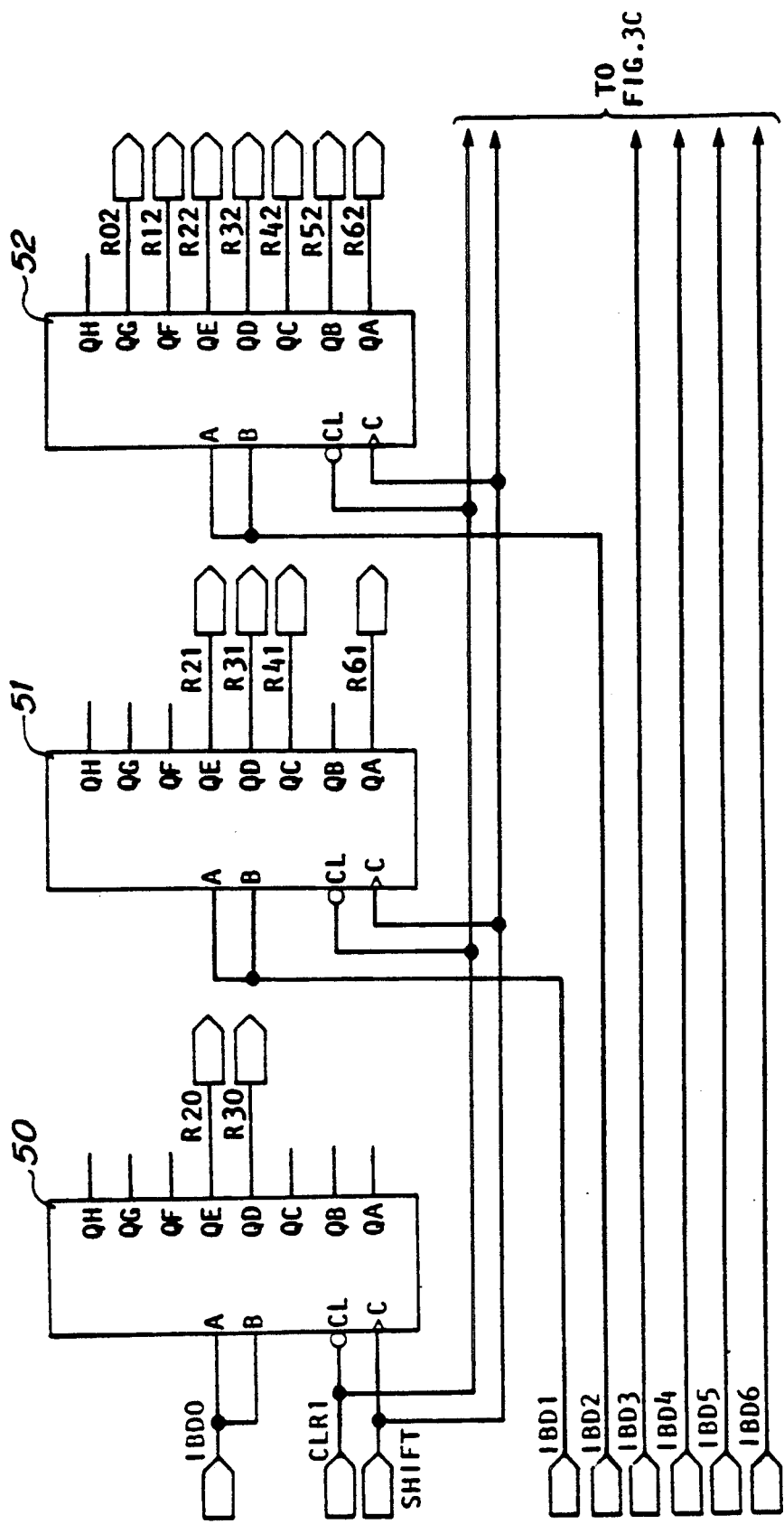
Figure 3C:
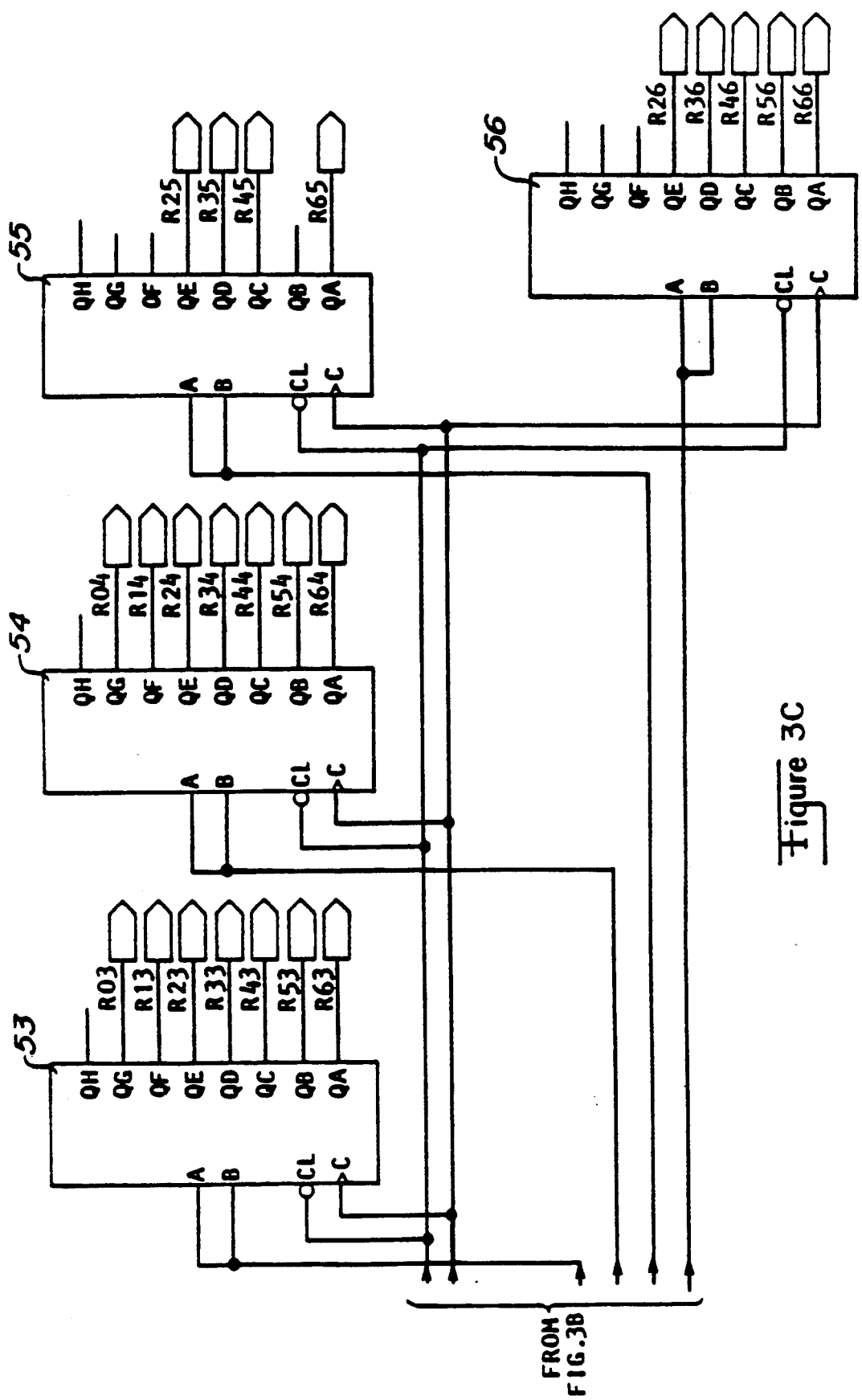
Figure 3D:
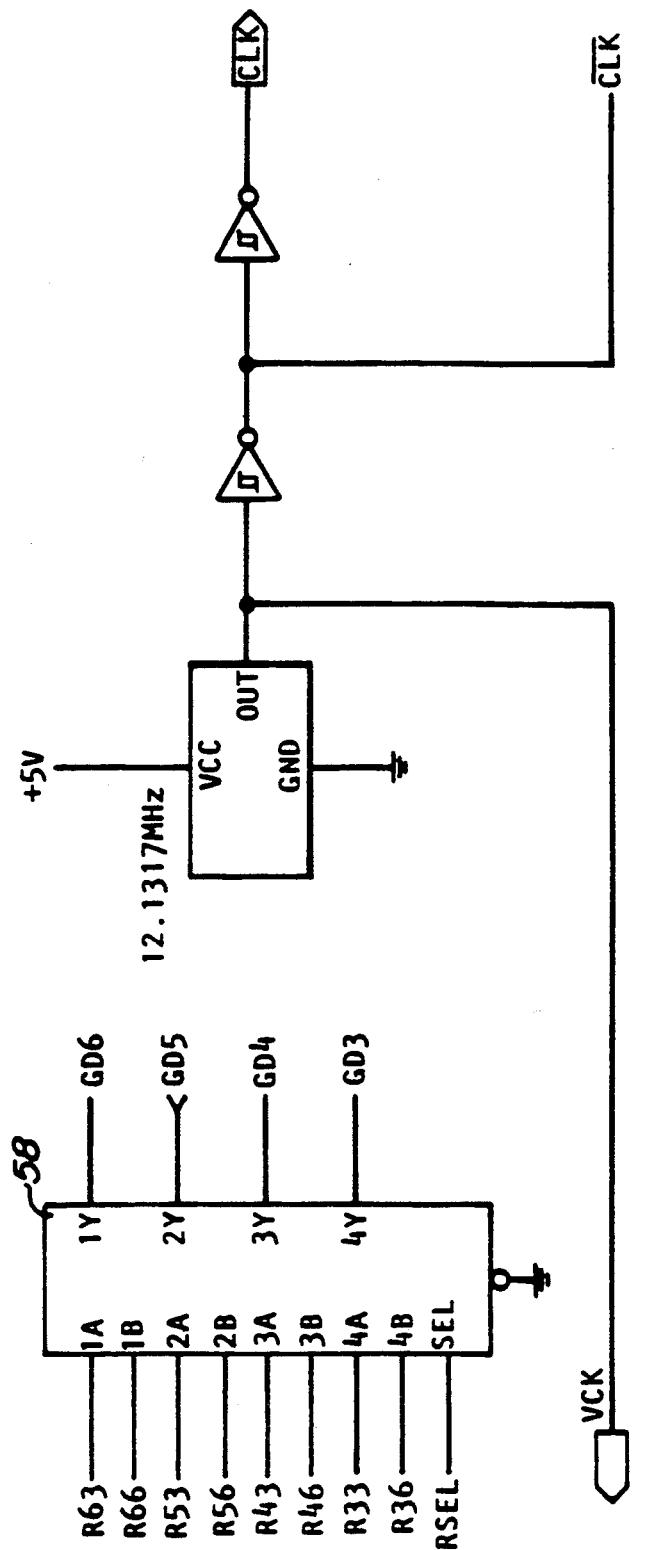
Figure 4A:
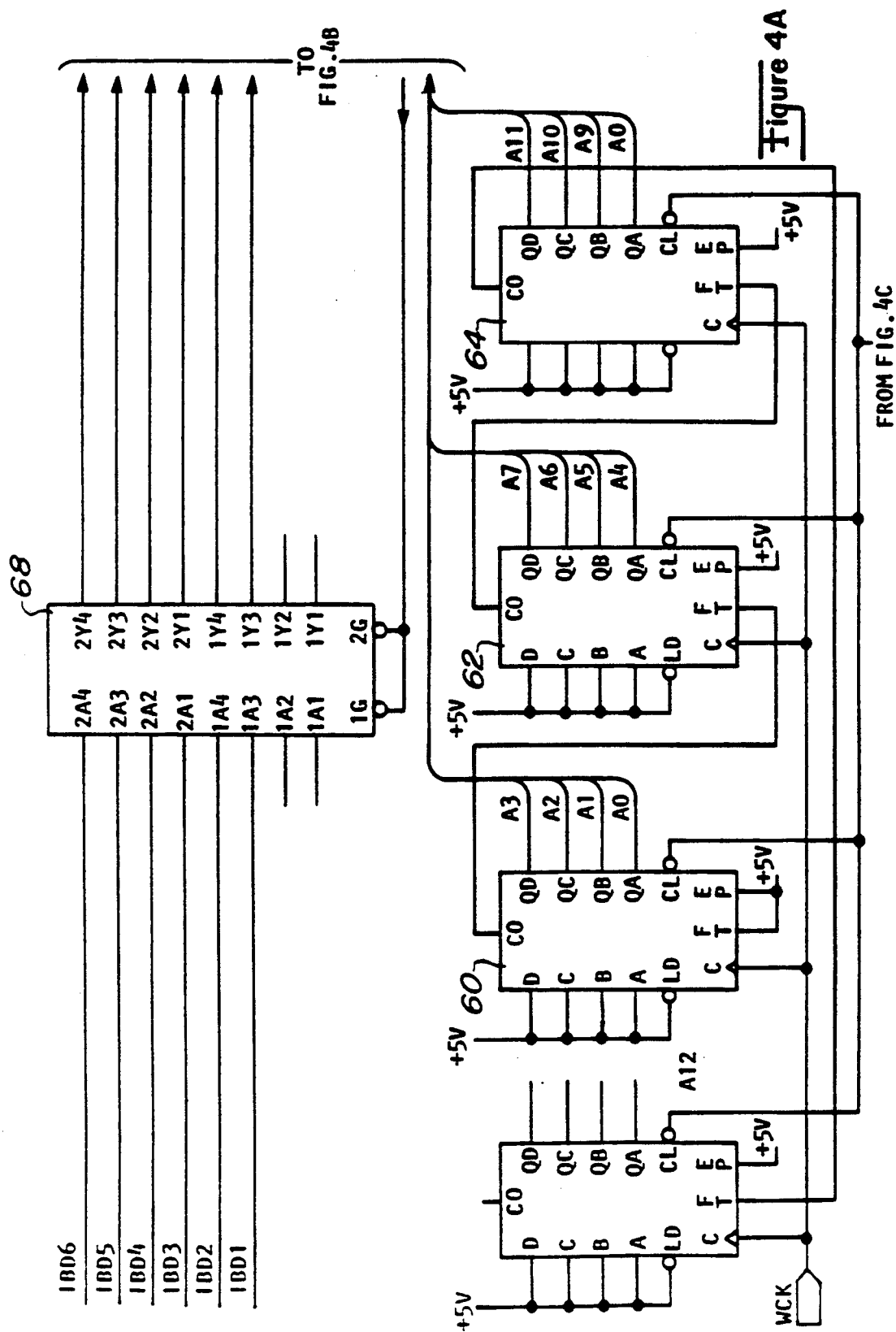
Figure 4B:
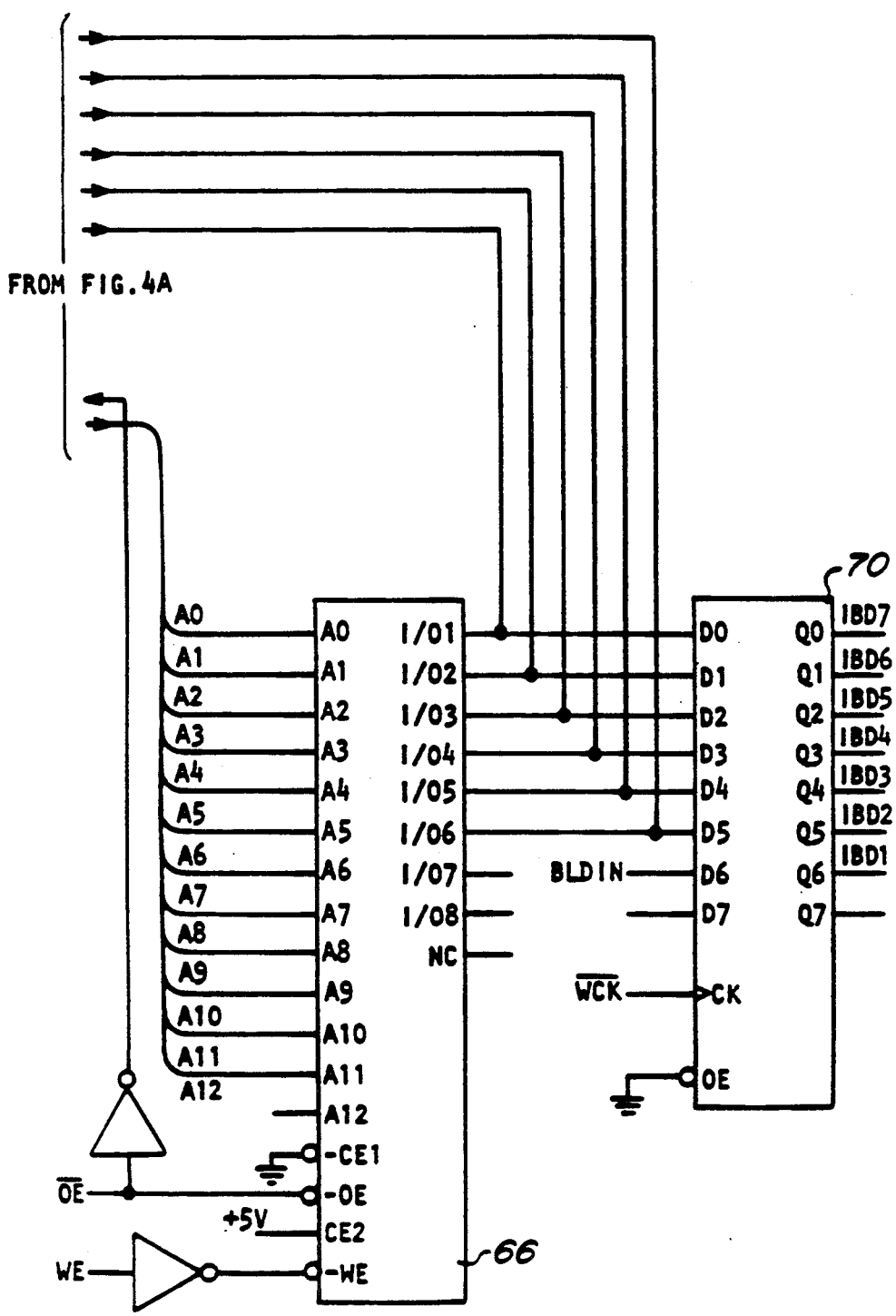
Figure 4B:
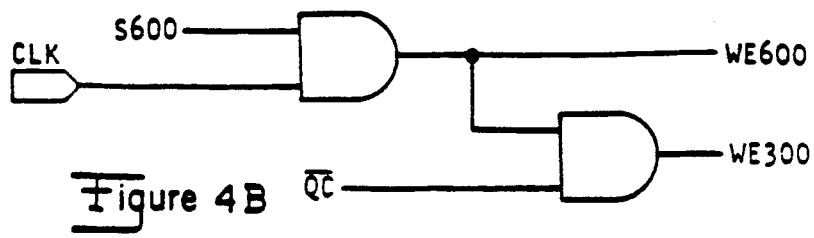
Figure 4C:
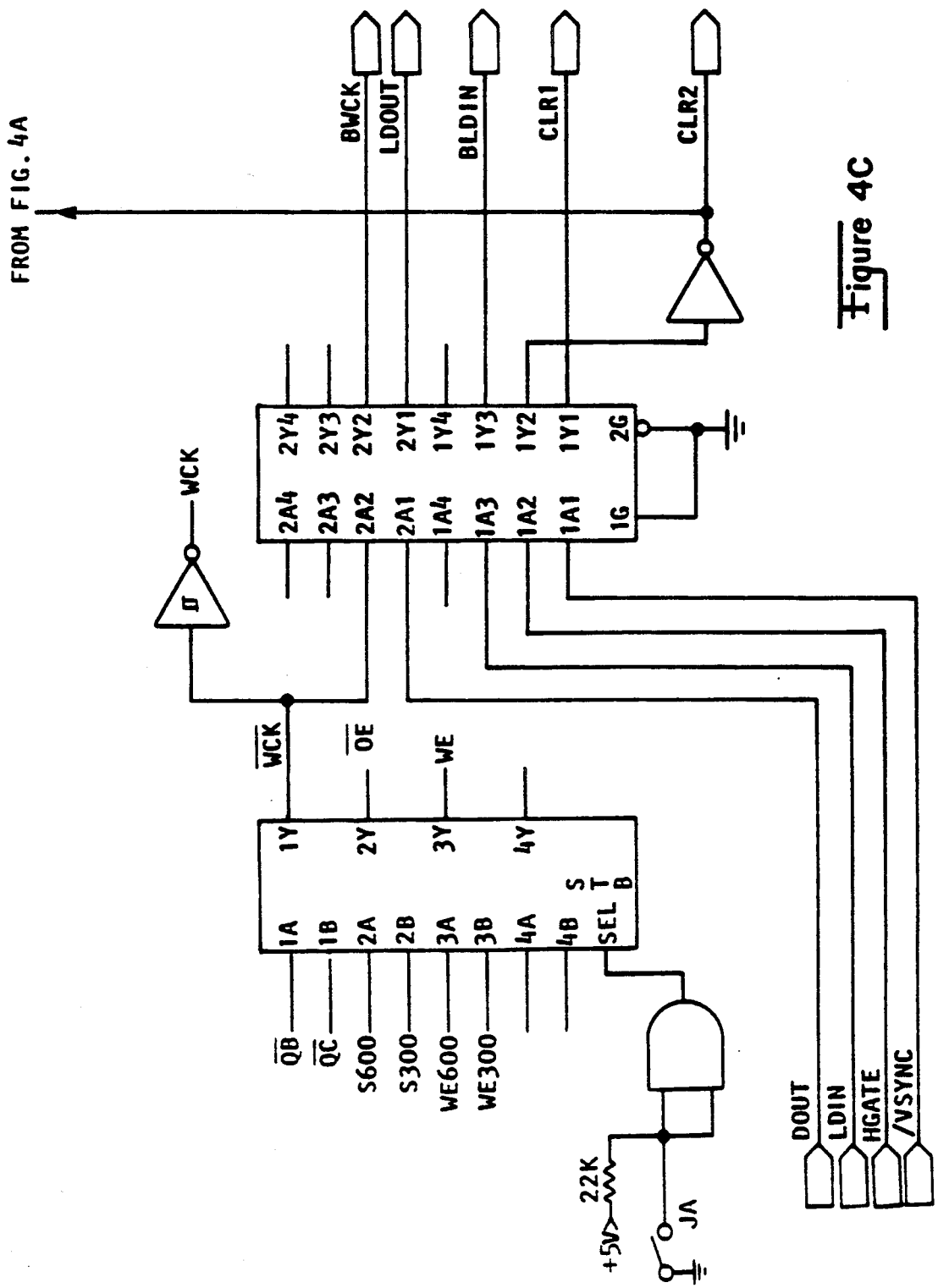

Having described the present invention in connection with certain preferred embodiments thereof, it should be understood that many modifications and variations thereto are possible, all of which fall with the true spirit and scope of the present invention. For example, an alternate embodiment for the present invention is illustrated by the schematic diagram of FIG. 8. Additionally, it should be understood to those skilled in the art that while the decoding array 24 has been described as a PLA, decoding array 24 may be constructed of other devices such as from generic array logic such as GAL26CV12 by Lattice. These GALs may be programed with boolean logic representing each of the predefined patterns. v,10/999

What is claimed is:

1. An apparatus for modifying data from a printer controller for printing on a laser printer, said apparatus comprising:
    a register coupled to receive data from the printer controller;
    modifying means for pulse width modifying the data in the register to produce gray shades on the laser printer, said modifying means having an input coupled to the output of the register and an output; and
    a calibration selector having a data input coupled to the output of the modifying means, a control input coupled to the printer controller and an output coupled to the laser printer for selecting between signals produced by the modifying means in response to control signals from the printer controller.

2. The apparatus of claim 1, wherein the modifying means is a PROM.

3. The apparatus of claim 1, wherein the calibration selector is a multiplexer.

4. An apparatus for enhancing edges printed by a laser printer with data from a printer controller, said apparatus comprising:
    a register coupled to receive and store data from the printer controller;
    memory means for storing patterns of data suitable for edge enhancement;
    comparing means having inputs coupled to receive data from the register and the memory means, said comparing means outputting correction data if the data from the register matches the data from the memory means; and
    means for modifying having a data input coupled to the output of the register, a control input coupled to the comparing means and a data output, said means smoothing the data received from the register in response to a control signal from the comparing means.

5. The apparatus of claim 4, further comprising a calibration selector having a data input coupled to the output of the modifying means, a control input coupled to the printer controller and an output coupled to the laser printer for selecting between signals produced by the modifying means in response to control signals from the printer controller.

6. The apparatus of claim 4, wherein the modifying means is a PROM.

7. The apparatus of claim 5, wherein the calibration selector is a multiplexer.

8. The apparatus of claim 4, wherein the memory means comprises random access memory and a plurality of counters.

9. The apparatus of claim 4, further comprising:
    a second modifying means for pulse width modifying the data in the register to produce gray shades on the laser printer, said modifying means having an input coupled to the output of the register and an output;
    a calibration selector having a data input coupled to the output of the first and second modifying means, a control input coupled to the printer controller and an output coupled to the laser printer for selecting between signals produced by the modifying means in response to control signals from the printer controller; and
    a mode selector having a plurality of inputs, and an output, a first input coupled to the output of the first modifying means, a second input .coupled to the output of the second modifying means, a third input coupled to receive control signals from the printer controller, and the output coupled to the laser printer, said mode selector outputting either pulse modified gray shades or edge enhanced data in response to the third input.

10. A method for enhancing edges printed by a laser printer, said method comprising the steps of:
    storing output data in a register;
    storing enhancement patterns in an array;
    comparing the output data to the enhancement patterns;
    modifying the output data to smooth the edges if the enhancement pattern matches the output data; and
    outputting the data to a laser printer.

11. A method for printing shades of gray with laser printer, said method comprising the steps of:
    storing output data in a register;
    pulse width modifying the output data stored in the register to produce shades of gray; and
    outputting the data to a laser printer.

12. The method of claim 11, wherein the data is input at 600 dpi and the pulse width modified data is output at 300 dpi.

13. The apparatus of claim 1 wherein the register receives data from the printer controller in groups of four pixels in 600 dpi format and the modifying means produces one 150 dpi pixel for each input group of four pixels.

14. The apparatus of claim 8 wherein the random access memory stores a pixel pattern 7 pixels wide and 7 pixels high.

15. The apparatus of claim 14 wherein the PROM compares pixel patterns in the register to those in the random access memory in patterns 3 pixels wide by 7 pixels high and 7 pixels wide by 3 pixels high within the time a single 300 dpi pixel is provided by the printer controller.

* * * * *